(12) United States Patent
Lee et al.

(10) Patent No.: US 9,942,367 B2
(45) Date of Patent: Apr. 10, 2018

(54) ELECTRONIC DEVICE AND METHOD FOR CONTROLLING THE ELECTRONIC DEVICE THEREOF

(71) Applicant: SAMSUNG ELECTRONICS CO., LTD., Suwon-si, Gyeonggi-do (KR)

(72) Inventors: Hyung-sun Lee, Yongin-si (KR); Youn-ho Choi, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/271,657

(22) Filed: Sep. 21, 2016

(65) Prior Publication Data

US 2017/0104855 A1 Apr. 13, 2017

Related U.S. Application Data

(60) Provisional application No. 62/240,845, filed on Oct. 13, 2015.

(30) Foreign Application Priority Data

Jan. 13, 2016 (KR) ........................ 10-2016-0004334

(51) Int. Cl.
*H04B 5/00* (2006.01)
*H04M 1/02* (2006.01)
(Continued)

(52) U.S. Cl.
CPC ............ *H04M 1/026* (2013.01); *G06F 1/165* (2013.01); *G06F 1/1652* (2013.01);
(Continued)

(58) Field of Classification Search
CPC ........ G06F 1/1647; G06F 1/1652; H04B 5/00
See application file for complete search history.

(56) References Cited

U.S. PATENT DOCUMENTS

D745,004 S 12/2015 Kim
9,300,772 B2 3/2016 Kim
(Continued)

FOREIGN PATENT DOCUMENTS

JP 2010-200134 9/2010
JP 2011-151658 8/2011
(Continued)

OTHER PUBLICATIONS

Search Report and Written Opinion dated Jan. 10, 2017 in counterpart International Patent Application No. PCT/KR2016/011322.

*Primary Examiner* — Cindy Trandai
(74) *Attorney, Agent, or Firm* — Nixon & Vanderhye P.C.

(57) ABSTRACT

Provided herein are an electronic device and a method for controlling the electronic device, the electronic device including a display including a main display area arranged on a front surface of the electronic device and a sub display area that extends from one side of the main display area and arranged on at least one area of a rear surface of the electronic device; a receiver including audio output circuitry configured to output audio received from an external terminal; a display antenna located on one or more of the main display area and the sub display area, and configured to perform communication with an external terminal; and a processor configured to control the display antenna based on a network state or a type of an application being executed.

13 Claims, 30 Drawing Sheets

FRONT SURFACE

REAR SURFACE

(51) Int. Cl.
  *G06F 1/16* (2006.01)
  *G06F 3/0346* (2013.01)
  *H01Q 1/24* (2006.01)
  *H01Q 1/44* (2006.01)
  *H01Q 21/28* (2006.01)
  *H04M 1/725* (2006.01)

(52) U.S. Cl.
  CPC .......... *G06F 1/1698* (2013.01); *G06F 3/0346* (2013.01); *H01Q 1/243* (2013.01); *H01Q 1/44* (2013.01); *H01Q 21/28* (2013.01); *H04M 1/0266* (2013.01); *H04M 1/72519* (2013.01); *H04M 1/72569* (2013.01); *H04M 2250/16* (2013.01)

(56) References Cited

U.S. PATENT DOCUMENTS

| | | | |
|---|---|---|---|
| 9,438,709 B2 | 9/2016 | Kim | |
| 9,491,272 B2 | 11/2016 | Kim | |
| 2005/0158010 A1* | 7/2005 | Ikeda | G06F 1/1616 385/147 |
| 2006/0046719 A1* | 3/2006 | Holtschneider | H04W 4/02 455/434 |
| 2007/0263609 A1* | 11/2007 | Mitchell | H04L 12/66 370/356 |
| 2009/0010222 A1* | 1/2009 | Jechoux | H04W 36/30 370/331 |
| 2009/0219216 A1* | 9/2009 | Qi | H04B 1/005 343/702 |
| 2010/0159948 A1* | 6/2010 | Spivey | H04L 12/10 455/456.1 |
| 2010/0315358 A1* | 12/2010 | Chang | G06F 3/04883 345/173 |
| 2011/0026468 A1* | 2/2011 | Conrad | H04M 15/00 370/329 |
| 2011/0050975 A1* | 3/2011 | Chung | G06F 1/1624 348/333.02 |
| 2011/0059777 A1* | 3/2011 | Rao | G06F 21/32 455/566 |
| 2011/0117971 A1* | 5/2011 | Kim | G06F 1/1647 455/566 |
| 2012/0075212 A1* | 3/2012 | Park | G06F 3/04886 345/173 |
| 2013/0009890 A1* | 1/2013 | Kwon | G06F 3/04886 345/173 |
| 2013/0033434 A1* | 2/2013 | Richardson | G06F 3/0488 345/173 |
| 2013/0125045 A1* | 5/2013 | Sun | G06F 3/04883 715/788 |
| 2013/0156080 A1* | 6/2013 | Cheng | H01Q 1/243 375/222 |
| 2013/0176248 A1* | 7/2013 | Shin | G06F 3/041 345/173 |
| 2013/0178248 A1* | 7/2013 | Kim | H04M 1/0268 455/566 |
| 2014/0087658 A1 | 3/2014 | Hou et al. | |
| 2014/0101535 A1* | 4/2014 | Kim | G06F 3/1431 715/234 |
| 2014/0125612 A1* | 5/2014 | Park | G06F 3/0416 345/173 |
| 2014/0218321 A1 | 8/2014 | Lee et al. | |
| 2014/0253477 A1* | 9/2014 | Shim | G06F 3/0416 345/173 |
| 2015/0050964 A1 | 2/2015 | Gorilovsky et al. | |
| 2015/0085435 A1* | 3/2015 | Sakakibara | H04M 1/026 361/679.3 |
| 2015/0227227 A1 | 8/2015 | Myers et al. | |
| 2015/0249729 A1 | 9/2015 | Kim | |
| 2016/0014246 A1 | 1/2016 | Kim | |
| 2016/0014719 A1 | 1/2016 | Kim | |
| 2016/0191215 A1 | 6/2016 | Lee et al. | |
| 2016/0294995 A1 | 10/2016 | Kim | |

FOREIGN PATENT DOCUMENTS

| | | |
|---|---|---|
| JP | 2013-225815 | 10/2013 |
| JP | 2015-162733 | 9/2015 |
| KR | 10-2011-0080023 | 7/2011 |
| KR | 10-2014-0099133 | 8/2014 |
| KR | 10-1488889 | 2/2015 |
| KR | 10-1515629 | 4/2015 |
| KR | 10-2015-0104280 | 9/2015 |
| WO | WO 2015-023275 | 2/2015 |

\* cited by examiner

100

FRONT SURFACE

REAR SURFACE

FRONT SURFACEREAR SURFACE 790　　　　　　　　　　　　　　790
FRONT SURFACE　　　　　REAR SURFACE

FRONT SURFACE           REAR SURFACE

ELECTRONIC DEVICE AND METHOD FOR CONTROLLING THE ELECTRONIC DEVICE THEREOF

CROSS-REFERENCE TO RELATED APPLICATIONS

This application is based on and claims priority under 35 U.S.C. § 119 to Korean Patent Application No. 10-2016-0004334, filed on Jan. 13, 2016, in the Korean Intellectual Property Office, and United States Provisional Patent Application No. 62/240,845, filed on Oct. 13, 2015, in the United States Patent and Trademark Office, the disclosures of which are incorporated by reference herein in their entireties.

BACKGROUND

Field

Apparatuses and methods of the present disclosure relate generally to an electronic device, and a method for controlling the electronic device, and for example, to an electronic device that includes a display antenna, and a method for controlling the electronic device.

Description of Related Art

Due to the advancement of electronic technologies, various types of electronic devices are being used. Especially, a half round display is being developed, which is a type of display that is expanded up to the rear surface of an electronic device by out bending.

In the case of such an electronic device, the ratio of the size area of the display to the size area of the electronic device is increased, thereby increasing the size area from which a user may view the display. On the other hand, this reduces the space to place a conventional antenna, which is a problem.

That is, it is necessary to come up with a method to arrange an antenna in an electronic device that has a display expanded on not only the front surface but also on the rear surface of the electronic device.

SUMMARY

Therefore, the present disclosure addresses the aforementioned problems of conventional technology by providing an electronic device having a display antenna on a display arranged on a front surface or on a rear surface of the electronic device, and a method for controlling the electronic device.

According to an example embodiment of the present disclosure, an electronic device includes display including a main display area arranged on a front surface of the electronic device and a sub display area that extends from one side of the main display area and arranged on at least one area of a rear surface of the electronic device; a receiver configured to output audio received from an external terminal; a display antenna located on one or more of the main display area and the sub display area, said display antenna configured to perform communication with an external terminal; and a processor configured to control the display antenna based on a network state or a type of an application being executed.

According to another example embodiment of the present disclosure, a method for controlling an electronic device including a display including a main display area arranged on a front surface of the electronic device, and a sub display area extending from one side of the main display area and arranged on at least one area of a rear surface of the electronic device; and a display antenna located on at least one of the main display area and the sub display area, said display antenna configured to perform communication with an external terminal, the method comprising executing an application; and controlling the display antenna based on a network state or a type of the application being executed.

According to the various aforementioned example embodiments, an electronic device is capable of driving a display antenna based on whether or not a telephone call is being made, a distance of a head of a user, performance of the antenna, orientation of the electronic device, state of gripping the electronic device, and/or the application being executed.

BRIEF DESCRIPTION OF THE DRAWINGS

The above and/or other aspects of the disclosure will be more apparent from the following detailed description, taken in conjunction with the accompanying drawings, in which like reference numerals refer to like elements, and wherein.

DETAILED DESCRIPTION

Figure 1A:
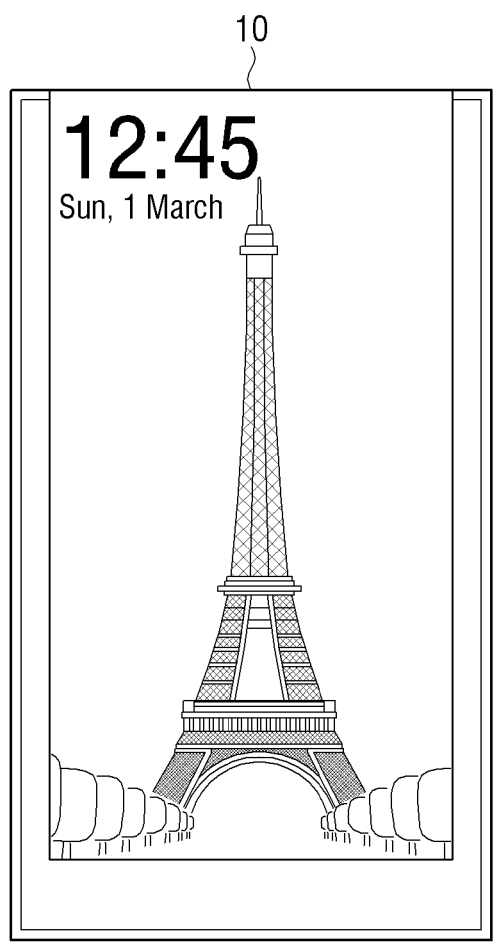
FIGS. 1A and 1B are diagrams illustrating an example of a structure of a display of an electronic device.
Figure 1A:
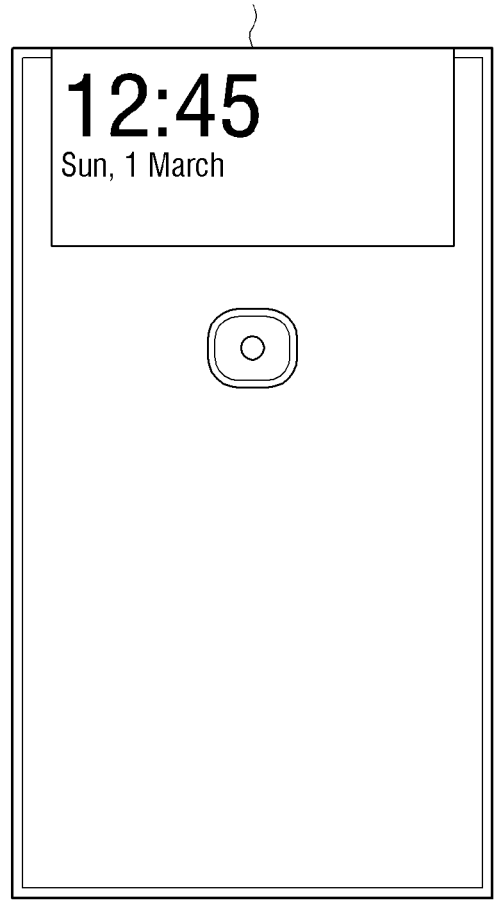

Although various example embodiments of the present disclosure are illustrated and described herein for purposes of illustration, those of ordinary skill in the art would understand that modifications, equivalents, and/or alternatives of the described example embodiments may be made in various different ways without departing from the spirit or scope of the present disclosure. Accordingly, the drawings and description are intended to be illustrative in nature and not restrictive, and like reference numerals refer to like elements.

It will be understood that, although the terms first, second, etc. may be used herein to describe various components, these components should not be limited by these terms. These terms are only used to distinguish one component from another component, and not to limit the order or significance of the components. For example, a first component below could be termed a second component, and vice versa without departing from the teachings of the disclosure.

Furthermore, one component (for example: a first component) being operatively or communicatively coupled or connected to another component (for example: a second component) should be understood as including cases where the component is indirectly connected, or indirectly connected through another component (for example: a third component). On the other hand, one component (for example: a first component) being "directly connected" or "directly coupled" to another component (for example: a second component) should be understood as a case where there is no other component (for example: a third component) between those components.

The terms in the present disclosure are used to explain any example embodiment, and thus may not be intended to limit the scope of another example embodiment. Furthermore, in the present disclosure, singular expressions may have been used for the sake of ease of explanation, but unless explicitly mentioned otherwise, the singular expressions may be interpreted to include plural expressions. Furthermore, the terms used in the present disclosure may have the same meanings as those generally understood to those skilled in the related art. Of the terms used in the present disclosure, the terms defined in normal dictionaries may be interpreted to have the same or similar meanings in the context of the related art, and unless explicitly mentioned otherwise in the present disclosure, the terms should not be interpreted idealistically or overly formally. The terms defined in the present disclosure should not be interpreted to exclude the example embodiments of the present disclosure.

Hereinafter, the present disclosure will be explained in greater detail with reference to the drawings attached.

Figure 1B:
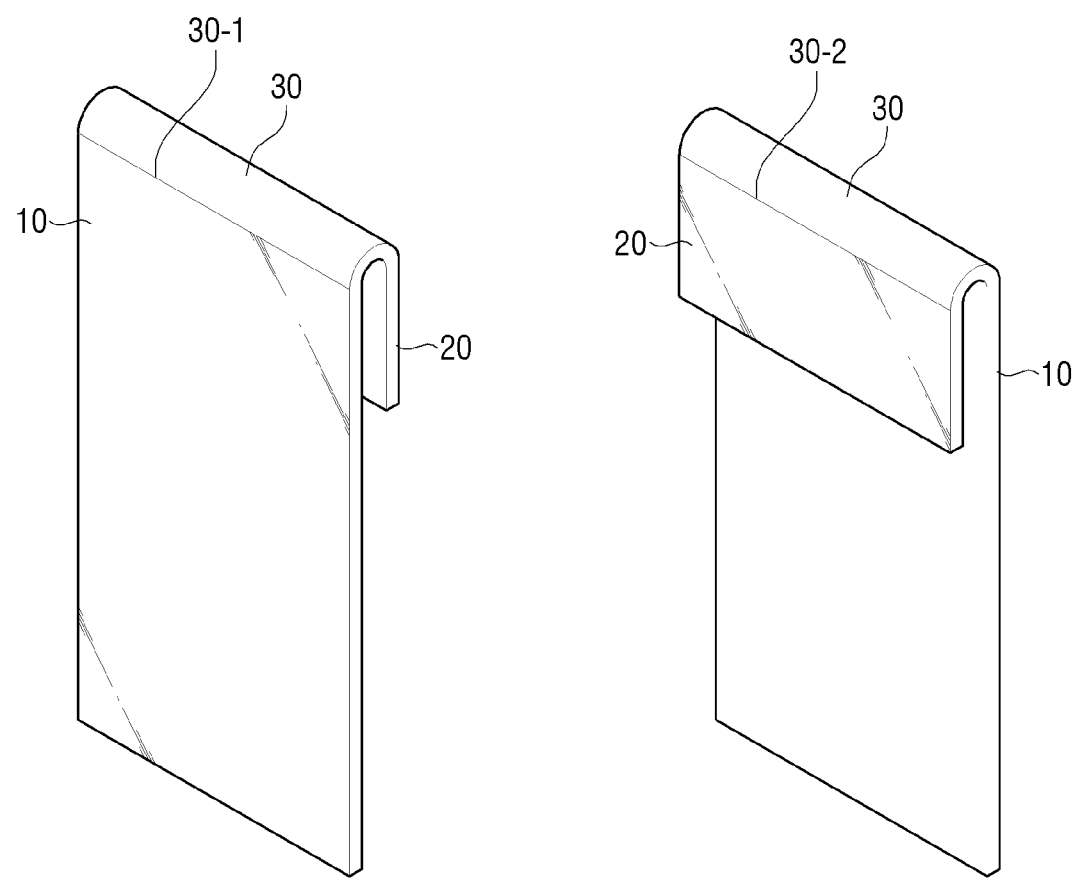

FIGS. 1A and 1B are diagrams illustrating an example of a structure of a display of an electronic device 100.

The left side view of FIG. 1A illustrates a front surface of the electronic device 100, and the right side view of FIG. 1A illustrates a rear surface of the electronic device 100. On the front surface of the electronic device 100, a front surface display is arranged, and on the rear surface of the electronic device 100, a rear surface display is arranged. The front surface display and the rear surface display may be connected to each other, and the rear surface display may be smaller than the front surface display, but without limitation. For example, the front rear surface display and the rear surface display may be of a same size. Hereinafter, the front surface display will be referred to as a main display area 10, and the rear surface display will be referred to as a sub display area 20.

The left side view of the FIG. 1B illustrates a front surface view of a display where the main display area 10, the sub display area 20, and the round display area 30 are connected, and the right side view of FIG. 1B illustrates a rear surface view of the display.

The sub display area 20 may extend from one side of the main display area 10 and be arranged on at least one area of the rear surface of the electronic device 100. For example, the sub display area 20 may extend such that it bends from an upper side of the main display area 10. The bent area may have a curved shape, but without limitation, and thus the bent area may have an angle depending on the type of the display.

The round display area 30 is an area connecting the main display area 10 and the sub display area 20. As mentioned above, the round display area 30 may have a curved shape, or an angled shape. The round display area 30 may be of a curved surface shape or an angled shape. The round display area 30 is divided into the main display area 10 and the sub display area 20 by a boundary line 30-1, 30-2. The round display area 30 may be expressed in various ways such as an edge display area, a curved display area and the like.

Meanwhile, in the aforementioned example embodiment, the sub display area 20 and the round display area 30 are displayed separately, but without limitation, and thus, the sub display area 20 and the round display area 30 may form one sub display area.

Furthermore, as illustrated in FIG. 1B, the round display area 30 may be divided into the main display area 10 and the sub display area 20 by the boundary line 30-1, 30-2. Meanwhile, the boundary line 30-1, 30-2 illustrated in FIG. 1B is simply an example embodiment, and thus the boundary line 30-1, 30-2 may be modified in various shapes. Furthermore, the boundary line 30-1, 30-2 may be determined by the manufacturer of the electronic device when manufacturing the electronic device, but it may be modified by a user as well, or by an application being executed. As the boundary line 30-1, 30-2 is modified, the size area of the main display area 10, the sub display area 20 and the round display area 30 may be modified, and the size area of a content being displayed on each area may be modified as well.

Meanwhile, FIGS. 1A and 1B illustrate that the display covers an upper side of the electronic device 100, but it is possible that the display covers one or more of a lower side, left side, and right side of the electronic device 100. Furthermore, it is possible that the display covers not just one side but a plurality of sides. For example, the display may be realized to cover the upper side and the lower side of the electronic device.

Hereinafter, a description of a structure where the sub display area 20 extends from the main display area 10 via the round display area 30 that has a curved shape will be provided. Furthermore, example embodiments where a display has other types of structures will be described.

Furthermore, hereinafter, based on the direction from the main display area 10 and the sub display 20 towards the round display area 30, its upper side will be referred to as an upper side of the electronic device 100 and the opposite side thereof will be referred to as a lower side of the electronic device 100. Furthermore, determining left or right is based on the user viewing the display area. Therefore, the left and right side of when the user views the main display area 10 will be opposite to the left and right side of when the user views the sub display area 20.

Figure 2A:
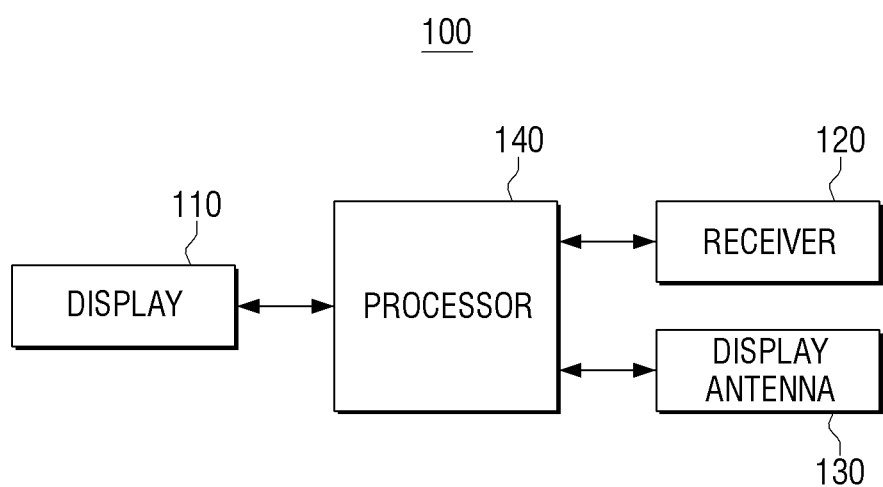
FIG. 2A is a block diagram illustrating an example configuration of an electronic device according to an example embodiment of the present disclosure.

FIG. 2A is a block diagram illustrating an example configuration of an electronic device 100 according to an example embodiment of the present disclosure.

According to FIG. 2A, the electronic device 100 includes a display 110, a receiver (e.g., including audio output circuitry) 120, a display antenna 130, and a processor 140.

The display 110 may include a main display area 10 arranged on a front surface of the electronic device 100, a sub display area 20 that extends from one side of the main display area 10 and arranged on at least one area of a rear surface of the electronic device 100, and a round display area 30 that connects the main display area 10 and the sub display area 20, but without limitation. For example, the sub display area 20 may be configured to cover an entirety of the rear surface of the electronic device 100, instead.

Herein, the front surface and the rear surface are terms used for ease of explanation, but there is not limitation thereto. For example, in a particular electronic device, the front surface and the rear surface may be interpreted as one side and another side of the electronic device. Furthermore, it was explained that the sub display area 20 extends from one side of the main display area 10, but there is no limitation thereto. For example, it may extend from all sides of the main display area 10 and cover an entirety of the electronic device 100.

The sub display area 20 of the display 110 may extend such that it bends from an upper side of the main display area 10 and arranged on an upper portion of the rear surface. For example, when viewed from the side of the electronic device, the portion connecting the main display area 10 and the sub display area 20 may form a curve that looks like 'U', but there is no limitation thereto. For example, when viewed from the side of the electronic device, the portion connecting the main display area 10 and the sub display area 20 may have an angle of 90° that may look like 'ㄷ' in cross section. Besides the aforementioned, the connection portion may be formed in various shapes based on the shape of the electronic device 100.

The display 110 may display various kinds of UIs provided under the control of the processor 140. For example, the display 110 may display a UI for reproducing a content, a UI for a telephone call, and the like. The display 110 may also display a different content on each of the main display area 10, the sub display area 20, and the round display area 30 under the control of the processor 140. For example, the display 110 may display a video on the main display area 10, an image on the sub display area 20, and a UI for message transmission on the round display area 30.

The display 110 may operate at least two areas of the main display area 10, the sub display area 20, and the round display area 30 in an interlocked manner to display a content. For example, the display 110 may display a video on the main display area 10, and display a UI for controlling the video on the sub display area 20. Furthermore, the display 110 may display a UI for providing a function that is irrelevant to the video on the round display area 30.

The display 110 may display a same content on at least two areas of the main display area 10, the sub display area 20 and the round display area 30. For example, the display 110 may display a same content on the main display area 10 and on the sub display area 20, and display a different content on the round display area 30.

The display 110 may be realized, for example, as a liquid crystal display (LCD) panel, an organic light emitting diode (OLED) display, or a plasma display panel (PDP) and the like, but without limitation. The display 110 may be realized as a transparent display, or a flexible display and the like.

The receiver 120 includes audio output circuitry configured to output audio received from an external terminal. For example, in the case of having a telephone call with an external terminal, the receiver 120 outputs voice of a counterpart of the call received from the external terminal.

In this example, the receiver may be located on a front upper portion of the electronic device 100. In the case where the display 110 covers an entirety of the front surface of the electronic device 100, the receiver 120 may, for example, be realized as an osteophony speaker located under the display 110, but there is no limitation thereto. Thus, a hole may be formed in the display 110 to output the audio received from the external terminal instead.

In the aforementioned example embodiment, it was explained that there is only one receiver 120, but there is no limitation thereto. There may be two or more receivers 120. When there are two receivers 120, the receivers 120 may, for example, each be located on a front upper portion and on a rear upper portion of the electronic device 100. Furthermore, when there are four receivers 120, the receivers 120 may, for example, each be located on a front upper portion, a front lower portion, a rear upper portion, and a rear lower portion.

The display antenna 130 may be arranged on the display 110. For example, the display antenna 130 may be arranged above or under a display panel of the display 110. The location of the display antenna 130 may be determined depending on the location of the receiver 120. For example, the display antenna 130 may be located on an opposite surface of the receiver 120 so as to be distanced from the head of a user. For example, in the case where the receiver 120 is located on the front surface of the electronic device 100, the display antenna 130 may be located on the sub display area 20 located on the rear surface of the electronic device 100. In another example, in the case where the receiver 120 is located on the rear surface of the electronic device 100, the display antenna 130 may be located on at least a portion of the main display area 10 on the front surface of the electronic device 100.

Furthermore, there may be a plurality of display antennas 130. For example, the display antennas 130 may be located on a plurality of display areas of at least a portion of the main display area 10, at least a portion of the sub display area 20, and the round display area 30.

The display antenna 130 may be used in one or more wireless communication (for example, Wi-Fi, 3GPPS, LTE, NFC and the like).

The processor 140 may be configured to control the overall operations of the electronic device 100.

For example, the processor 140 may be configured to control the display antenna 130 based on a network state or a type of an application being executed.

In an example embodiment, in the case where the receiver 120 is located on the front surface of the electronic device 100, the display antenna 130 may be located on the sub display area 20 on the rear surface of the electronic device 100, and a low end antenna for communicating with an external terminal is located on a low end of the main display area 10, the processor 140 may be configured to control the display antenna 130 to operate, when performing a voice call with an external terminal, as an antenna for receiving voice data transmitted from the external terminal, and control the low end antenna to operate as an antenna for receiving the voice data transmitted from the external terminal and for transmitting the voice data of the electronic device 100 to the external terminal. For example, the processor 140 may be configured to use the low end antenna located far away from the head of the user as an RX/TX antenna, and use the display antenna 130 located close to the head of the user as an RX antenna.

In this example, the processor 140 may be configured to determine a communication state based on a state of gripping the electronic device by a current user and to control the display antenna 130 and the low end antenna. For example, when it is determined that the transmission/reception sensitivity of the low end antenna is below a predetermined value, the processor 140 may be configured to control the low end antenna to operate as the antenna for receiving the voice data transmitted from the external terminal, and to control the display antenna 130 as the antenna for receiving the voice data transmitted from the external terminal and for transmitting the voice data of the electronic device 100 to the external terminal. For example, the processor 140 may be configured to use the display antenna 130 as the RX/TX antenna, and use the low end antenna as the RX antenna, instead.

Furthermore, the processor 140 may be configured to control the display 110 to provide a UI for a telephone application on the main display area 10. For example, the processor 140 may be configured to control the display 110 to provide the UI (for example, a telephone number input UI element, call volume control UI element and the like) for a telephone application on the main display area 10 where the receiver 120 is located.

In another example embodiment, in the case where the receiver 120 is located on a front upper portion and on a rear upper portion of the electronic device 100, and the display antenna 130 is located on an upper portion of the main display area 120 and on the sub display area 20, the processor 140 may be configured to output audio through one of a first receiver that is located on a front upper portion of the electronic device 100 and a second receiver located on a rear upper portion of the electronic device 200 based on a state of gripping detected through a sensor, and then communicate with the external terminal through the display antenna located on the opposite side of the receiver from which the audio is being output. For example, in the case where the user is gripping the electronic device 100 such that the front surface of the electronic device 100 touches the user's face, the processor 140 may output audio through the first receiver located on the front surface, and perform communication with the external terminal through the display antenna 130 located on the sub display area 20.

In this case, the processor 140 may be configured to control the display 110 to provide a UI for a telephone call application on the display area where the receiver from which the audio is being output is located of the main display area 10 and the sub display area 20. For example, in the case where the user is gripping the electronic device 100 such that the front surface of the electronic device 100 touches the user's face, the processor 140 may be configured to control the display 110 to provide the UI for a telephone call application on the main display area 10 where the receiver from which the audio is being output is located.

Furthermore, when a telephone call request is received from an external terminal, the processor 140 may be configured to determine which surface of the electronic device 100 faces upwards based on the orientation of the electronic device 100 sensed through the sensor, and may control the display 110 to display a UI element for receiving or rejecting the telephone call on the display area corresponding to the determined surface.

Figure 2B:
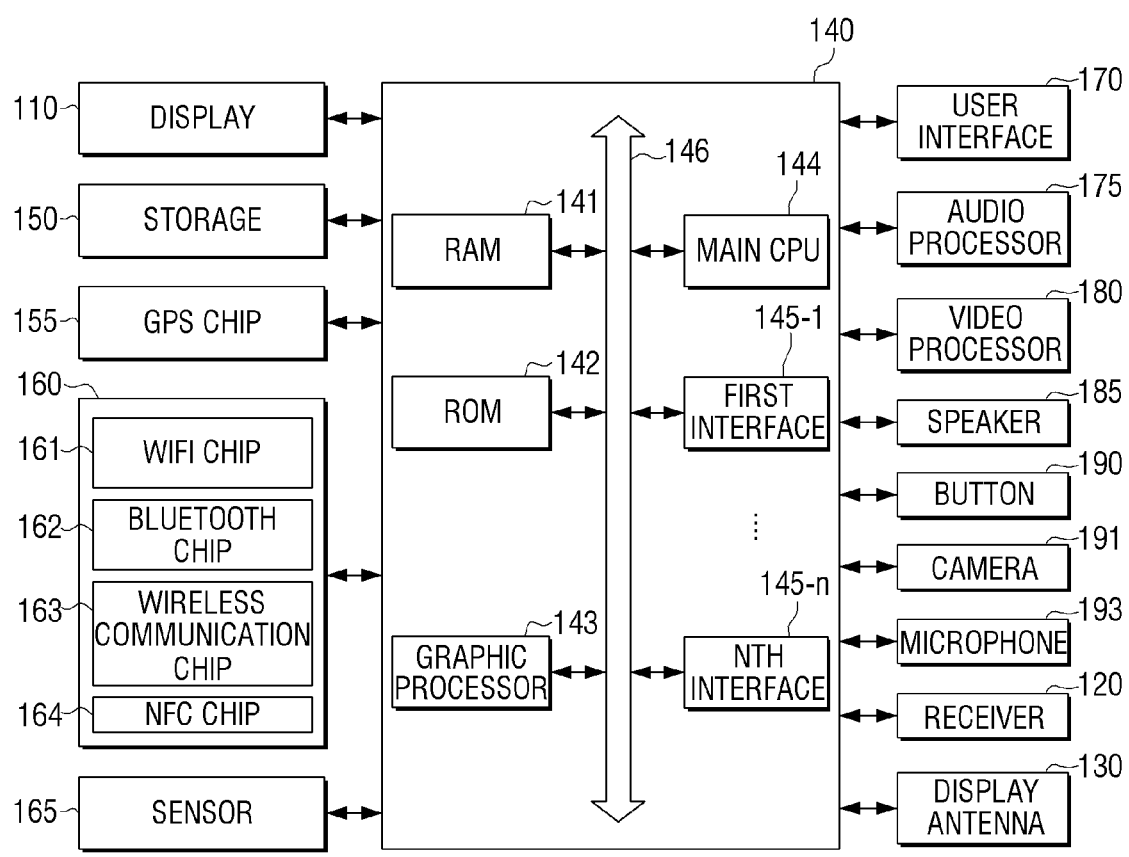
FIG. 2B is a block diagram illustrating an example of a configuration of a display device.

FIG. 2B is a block diagram illustrating, in greater detail, an example of a configuration of the display device 100. According to FIG. 2B, the display device 100 includes a display 120, a receiver (e.g., including audio output circuitry) 120, a display antenna 130, a processor 140, a storage 150, a GPS chip 155, a communicator (e.g., including communication circuitry) 160, a sensor 165, a user interface 170, an audio processor 175, a video processor 180, a speaker 185, a button 190, a camera 191, and a microphone 193. For the components of FIG. 2B that are the same as the components illustrated in FIG. 2A, detailed explanation will be omitted.

The display 110 may be divided into a main display area 10, a sub display area 20, and a round display area 30 as discussed above. The display 110 may be realized as various types of displays such as a liquid crystal display (LCD) panel, an organic light emitting diode (OLED) display, or a plasma display panel (PDP) and the like. In the display 110, a driving circuit or a backlight unit such as an a-si TFT, a low temperature poly silicon (LTPS) TFT, and an organic TFT (OTFT) may be included as well. Furthermore, the display 110 may be combined with a touch sensor included in the sensor 165 and be realized as a touch screen.

In this case, the touch sensor may include at least one of a touch panel and a pen recognition panel. The touch panel may sense a finger gesture input by the user, and output a touch event value corresponding to the sensed touch signal. The touch panel may be mounted under at least one area of the main display area 10, the sub display area 20, and the round display area 30 of the display 110. There are two ways for the touch panel to sense a finger gesture input by the user: the capacitive method and the resistive method.

The pen recognition panel may sense a pen gesture input by the user made by operating a touch pen (for example, a stylus pen), or a digitizer pen, and output a pen proximity event value or a pen touch event value. The pen recognition panel may be mounted under at least one of the main display area 10, the sub display area 20, and the round display area 30 of the display 110.

When having a telephone call with an external terminal, the receiver 120 includes audio output circuitry configured to output the audio received from the external terminal. In this case, one receiver 120 may be located on a front upper portion of the electronic device 100, but this is merely an example embodiment. For example, the receiver 120 may be located on another position on the electronic device 100 (for example, on a rear upper portion and the like), or a plurality of receivers 120 may be provided.

The display antenna 130 is mounted within the display 110 to perform communication with an external terminal. In this case, the display antenna 130 may be located on at least one of the main display area 10, the sub display area 20, and the round display area 30. For example, the display antenna 130 may be made of a transparent indium tin oxide (ITO) or a flexible printed circuit board (FPCB).

Furthermore, on one surface of the electronic device 100, a plurality of display antennas may be arranged to be used in a plurality of wireless communications. For example, on the front surface of the electronic device 100, a display antenna for Wi-Fi and a display antenna for 5G wireless communication may be arranged. In this case, the display antenna for Wi-Fi may be arranged near the receiver 120, while the display antenna for 5G wireless communication is arranged far away from the receiver 120.

The electronic device 100 may have another antenna on a lower end or on an upper end of the electronic device 100 besides the display antenna 130.

The processor 140 is configured to control the overall operations of the electronic device 100 using various programs stored in the storage 150.

For example, the processor 140 includes a RAM 141, a ROM 142, a main CPU 144, a graphic processor 143, a first to $n^{th}$ interface 145-1~145-n, and a bus 146.

The RAM 141, the ROM 142, the main CPU 144, the graphic processor 143, and the first to $n^{th}$ interface 145-1~145-n may be connected to one another through buses 146.

The first to $n^{th}$ interface 145-1 to 145-n are connected to the various aforementioned components. One of the interfaces may be a network interface that is connected to an external device through the network.

The main CPU 143 accesses the storage 150, and performs a booting using an O/S stored in the storage 150. Furthermore, the main CPU 143 performs various operations using various programs stored in the storage 150.

In the ROM 142, sets of commands for system booting and the like are stored. When a turn-on command is input and power is supplied, the main CPU 144 copies the O/S stored in the storage 150 to the RAM 141 according to the command stored in the ROM 142, and executes the O/S to boot the system. When the booting is completed, the main CPU 144 copies various application programs stored in the storage 150 to the RAM 141, and executes the application programs copied in the RAM 141 to perform various operations.

The graphic processor 143 creates a screen that includes various objects such as an icon, an image, a text and the like using an operator part (not illustrated) and a rendering part (not illustrated). The operator part (not illustrated) computes attribute values such as a coordinate value, a shape, a size, a color, and the like for displaying each object according to the layout of the screen based on the received control command. The rendering part (not illustrated) creates screens of various layouts that include objects based on the attribute values computed in the operator part (not illustrated). The screen created in the rendering part (not illustrated) is displayed within the display area of the display 110.

Meanwhile, the aforementioned operation of the processor 140 may be performed by programs stored in the storage 150.

The storage 150 stores various data such as an O/S (Operating System) software module for driving the electronic device 100, a contents reproducing module, a display UI module of various applications and the like.

In this case, the processor 140 may process an input image and display the processed image based on the information stored in the storage 150.

A global positioning system (GPS) chip 155 is a component for receiving a GPS signal from a GPS satellite to compute a current location of the electronic device 100. When using a navigation program or when the current location of the user is needed, the processor 140 may compute the location of the user using the GPS chip 155.

The communicator 160 is a component including communication circuitry for communicating with various kinds of external devices according to various kinds of communication methods. The communicator 160 includes various communication circuitry, such as, for example, one or more of a Wi-Fi chip 161, a Bluetooth chip 162, a wireless communication chip 163, an NFC chip 164 and the like. The processor 140 communicates with various kinds of external devices using the communicator 160.

The Wi-Fi chip 161 and the Bluetooth chip 162 each perform communication in the Wi-Fi method and the Bluetooth method, respectively. In the case of using the Wi-Fi chip 161 or the Bluetooth chip 162, it is possible to transceive various pieces of connecting information such as information on an SSID, a session key and the like, and use the connecting information to make a connection, and then transceive various kinds of information. The wireless communication chip 163 may refer, for example, to a chip configured to perform communication according to various communication standards such as IEEE, zigbee, 3G (3rd Generation), 3GPP (3rd Generation Partnership Project), LTE (Long Term Evolution), and the like. The near field communication (NFC) chip 164 refers to a chip that operates in the NFC method that uses 13.56 MHz band of among various RF-ID frequency bands such as 135 kHz, 13.56 MHz, 433 MHz, 860~960 MHz, 2.45 GHz and the like.

Furthermore, the communicator 160 may perform unilateral communication or bilateral communication with the electronic device. In the case of performing unilateral communication, the communicator 160 may receive signals from the electronic device. In the case of performing the bilateral communication, the communicator 160 may receive signals from the electronic device, and/or transmit signals to the electronic device.

Furthermore, the communicator 160 may include an antenna for performing various wireless communication methods besides the display antenna 130.

Examples of the sensor 165 that may be used herein includes a touch sensor, a geomagnetic sensor, a gyro sensor, an acceleration sensor, a proximity sensor, a grip sensor and the like. The sensor 165 may sense various manipulations such as a rotation, an inclination, a pressure, an approach, a gripping and the like besides the aforementioned touches.

The touch sensor may be realized as a capacitive touch sensor or a resistive touch sensor. The capacitive touch sensor refers to a sensor configured to use a dielectric material coated on the display surface to sense micro electricity that is excited to the body of a user when the body part of the user touches the display surface so as to compute a coordinate of the touch. The resistive touch sensor refers to a touch sensor configured to sense a current that flows as an upper plate and a lower plate provided in the electronic device 100 contact each other in response to the user touching the display surface, and compute a coordinate of the touch. Besides the aforementioned, an infrared sensing method, a surface ultrasonic conduction method, an integral tensile measurement method, a piezo effect method and the like may be used to sense a touch interaction.

Otherwise, the electronic device 100 may use a magnetic and a magnetic field sensor, an optical sensor, or a proximity sensor and the like instead of the touch sensor to determine whether or not a touch object such as a finger or a stylus pen and the like touched or approached the display surface.

The geomagnetic sensor is a sensor for sensing a rotated state or a direction of movement of the electronic device 100. The gyro sensor is a sensor for sensing a rotation angle of the electronic device 100. The electronic device 100 may have both the geomagnetic sensor and the gyro sensor, but either one is sufficient to sense a rotated state of the electronic device 100.

The acceleration sensor is a sensor for sensing an extent of inclination of the electronic device 100.

The proximity sensor is a sensor for sensing an approaching motion of an object that does not touch but just approaches the display surface. The proximity sensor may be realized in various types of sensors including a high-frequency oscillation type sensor that forms a high-frequency magnetic field to sense a current induced by the magnetic field characteristics that change when an object approaches, a magnetic type sensor that uses a magnet, and a capacitive sensor that senses a change in the capacitive caused by an approaching object.

The grip sensor is a sensor that may, for example, be provided on a rear surface, circumference, or a handle part besides the touch sensor provided on the touch screen to sense a grip by the user. The grip sensor may be realized as a pressure sensor instead of a touch sensor.

The sensor 165 may sense a state of gripping made by the user, or an orientation of the electronic device 100 through various sensors mentioned above.

The user interface 170 receives various user interactions. Herein, the user interface 140 may be realized in various forms depending on the embodiment type of the electronic device 100. When the electronic device 100 is realized as a digital TV, the user interface 170 may be realized as a remote control receiver that receives remote control signals from a remote control, a camera that senses a motion of the user, a microphone that receives a voice of the user and the like. Furthermore, when the electronic device 100 is realized as a touch based portable terminal, the user interface 170 may be realized as a touch screen having a mutual layered structure with a touch pad. In this case, the user interface 170 may be used as the display 110 mentioned above.

The audio processor 175 is a component for processing audio data. The audio processor 175 may perform various processing operations such as decoding, amplifying, noise filtering and the like on the audio data.

The video processor 180 is a component for processing video data. The video processor 180 may perform various image processing operations such as decoding, scaling, noise filtering, frame rate conversion, resolution conversion and the like on the video data.

The speaker 185 is a component for outputting not only various audio data processed in the audio processor 175 but also various alarm sounds or voice messages and the like. Herein, the speaker 185 may be located on a lower end or on the rear surface of the electronic device 100, but this is a mere embodiment, and thus the speaker 185 may be located in another area.

The button 190 may various types of buttons such as a mechanical button, a touch pad, a wheel and the like provided on any area including the front surface, side part, and rear surface on the exterior of the main body of the electronic device 100.

The camera 191 is a component for photographing a still image or a video according to a control by the user. A plurality of cameras 191 may be provided as for example, a front camera and a rear camera. Especially, the camera 191 may be used to photograph a motion of a subject in control.

The microphone 193 is a component for receiving a user's voice or other sounds to convert the received user's voice or other sounds into audio data.

Besides the aforementioned, although not illustrated in FIG. 2B, in some example embodiments, the electronic device 100 may of course further include various kinds of external input ports for connecting various kinds of external terminals such as a USB port to which a USB connector may be connected, a headset, a mouse, a LAN and the like, a digital multimedia broadcasting (DMB) chip for receiving and processing DMB signals, various sensors and the like.

As aforementioned, the electronic device 100 may be realized as various kinds of devices such as a mobile phone, a tablet PC, a laptop PC, a PDA, an MP3 player, an electronic picture frame, a TV, a PC, a kiosk and the like. Therefore, the configuration explained in FIG. 2B may be modified in various ways depending on the type of the electronic device 100.

As aforementioned, the electronic device 100 may be realized in various forms and configurations.

Hereinafter, explanation will be made on the basic configuration and on various example embodiments to aid in understanding the present disclosure. FIGS. 3A to 3D are diagrams illustrating an example where one of the main display area 10, the sub display area 20, and the round display area 30 is used.

Figure 3A:
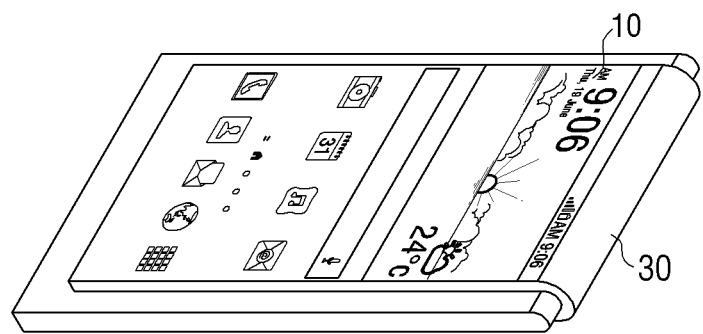
FIGS. 3A to 3D are diagrams illustrating examples of using one of a main display area, a sub display area, and a round display area.
Figure 3A:
Figure 3A:
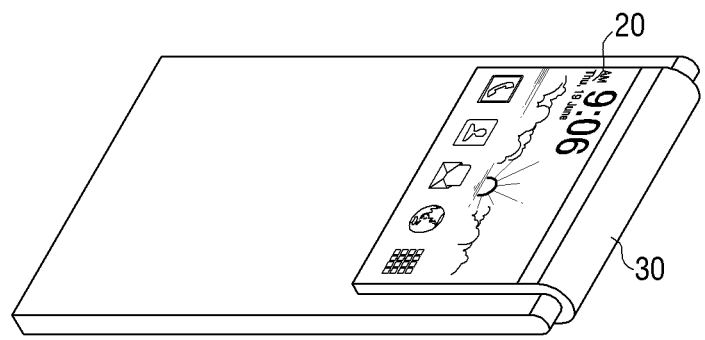

As illustrated in FIG. 3A, the processor 140 may determine an area to provide information based on the orientation of the electronic device 100. For example, the processor 140 may provide information on the main display area when the main display area 10 is oriented upwards, provide information on the sub display area when the sub display area 20 is oriented upwards, and provide information on the round display area 30 when the round display area 30 is oriented upwards.

When the processor 140 is providing information on one area, it may not provide information on the other two areas.

The processor 140 may perform an operation of determining the area to provide information when there is a user input of pressing a power button. Otherwise, the processor 140 may perform the operation of determining the area to provide information when a telephone call or a text message is received.

As discussed above, the area to provide information may be determined based on the orientation of the electronic device 100, but there is no limitation thereto. For example, the processor 140 may recognize the user and provide information through the area that is near the viewpoint of the user.

In this case, the processor 140 may recognize the user using the camera 182. The camera 182 may be provided on at least one of the front surface, the rear surface and the round surface of the electronic device 100. Herein, the round surface refers to a side near the round display area 30.

When the camera 182 is provided on at least one of the front surface, the rear surface and the round surface of the electronic device 100, the processor 140 may determine the area to provide information depending on whether or not the user is recognized. For example, in the case where the camera 182 is provided only on the rear surface of the electronic device 100, the processor 140 may provide information through the sub display area 20 when the user is recognized, and provide information through at least one of the main display area 10 and the round display area 30 when the user is not recognized.

Different information may be provided depending on the application being executed. For example, when a camera application is being executed, the processor 140 may provide a live view screen. Otherwise, when a telephone function is being executed, the processor 140 may provide a call receiving screen, an out-calling screen, a conversation screen and the like. Otherwise, when a message application is being executed, the processor 140 may provide a message receiving screen, a message contents screen, a message writing screen and the like.

Furthermore, even when the user's view is near the round display area 30, the processor 140 may provide information on the main display area 10 or on the sub display area 20.

Figure 3B:
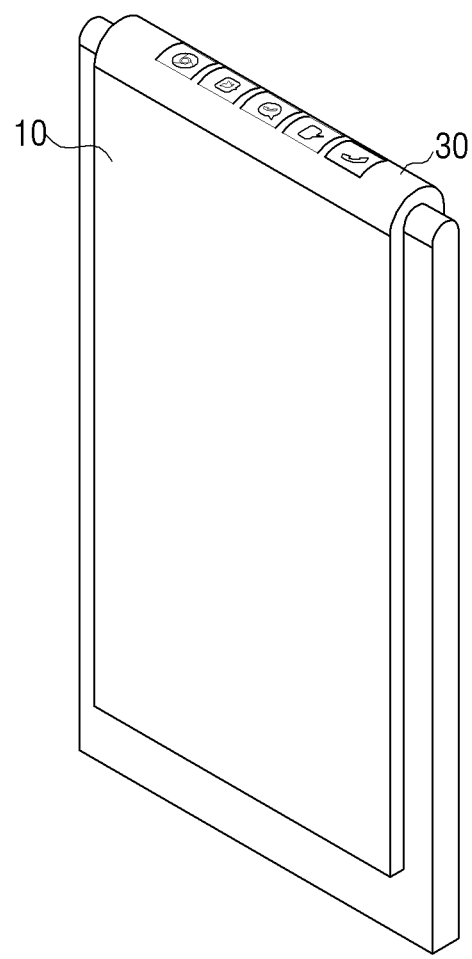

Furthermore, when the user is not recognized, the processor 140 may provide information on the round display area 30 as illustrated in FIG. 3B. Otherwise, even when the user is recognized, the processor 140 may provide information on the round display area 30 when the user's view is not towards the electronic device 100, but there is no limitation thereto. And thus the processor 140 may provide information on at least one of the main display area and the sub display area 20. Otherwise, the processor 140 may not be providing information, and once the user is recognized or the user's view is towards the electronic device 100, the processor 140 may then provide information.

Furthermore, the processor 140 may change the area to provide information as the user touches an area that did not provide information. For example, when a user input of sequentially touching an area of the sub display area 20 is received while information is being provided on the main display area 10, the processor 140 may display the information that used to be displayed on the main display area 10 on the sub display area 20.

Figure 3C:
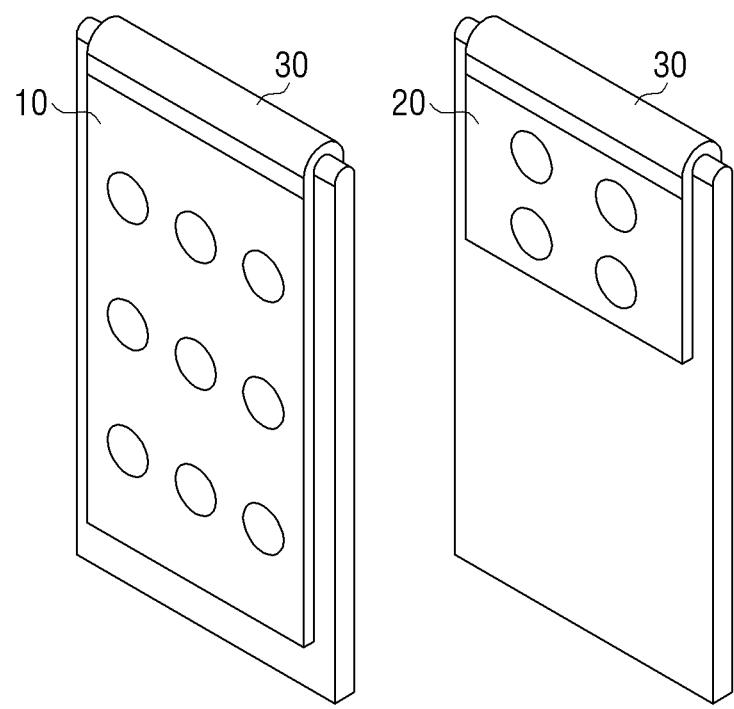

Furthermore, as illustrated in FIG. 3C, the processor 140 may display the same information differently for different areas. For example, the processor 140 may display a UI of a lock screen on the main display area 10, the sub display area, and the round display area 30, differently from one another. As illustrated in FIG. 3A, the processor 140 may change the area to display the information.

In this case, the areas may have different lock release patterns. Otherwise, the processor 140 may provide different lock release methods for different areas. For example, the processor 140 may provide a pattern lock screen as that illustrated in FIG. 3C for the main display area, a password release screen for the sub display area 20, and a fingerprint lock screen for the round display area 30.

FIG. 3C illustrates the case of a lock screen, but the same may be applied to other applications as well. For example, in the case of a camera application, various setting menus may be provided on the main display area 10 besides a preview image. In this case, when the area to display information is changed to the sub display area 20, the processor 140 may control the display 110 to display only the preview image on the sub display area 20. Otherwise, when the area to display information is changed to the round display area 30, the processor 140 may control the display 110 to display only the setting menus on the round display area 30.

Furthermore, as illustrated in FIG. 3A, the processor 140 may change the layout of the home screen differently for different display areas. Changing the layout of the home screen will be explained in detail hereinafter.

Otherwise, the processor 140 may control the display 110 to, when a telephone call or a text message is received, display a related UI on a display area to which the user's view is oriented. Otherwise, besides the aforementioned application, the processor 140 may display different UIs for each of the main display area 10, the sub display area 20, and the round display area 30, regarding a video application, a music application and the like as well.

Figure 3D:
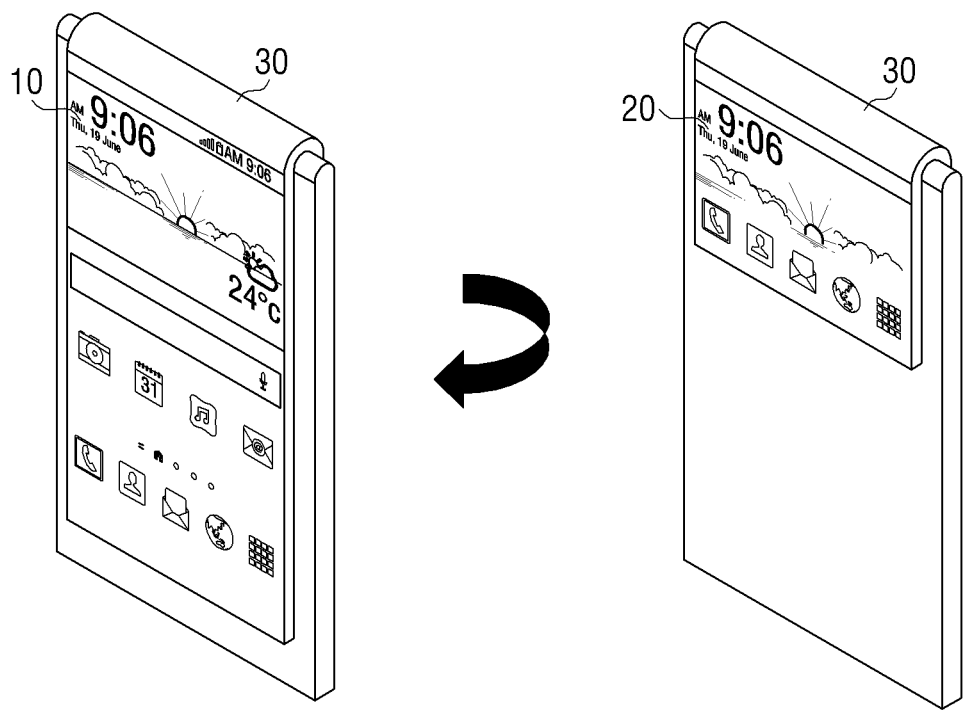

Furthermore, as illustrated in FIG. 3D, the processor 140 may change the area to provide information when the direction of the electronic device 100 changes. For example, when the electronic device 100 is rotated by or more than a predetermined angle with the home screen displayed on the main display area 10, the processor 140 may control the display 110 to display the home screen on the sub display area 20.

FIG. 3D illustrates the case where the display area has been changed from the main display area 10 to the sub display area 20, but there is no limitation thereto. For example, the processor 140 may determine the round display area 30 to be the display area depending on the rotation direction, rotation angle and the like.

Furthermore, when the direction of the electronic device 100 is changed and thus the display area is changed, the processor 140 may change the layout of the information to be provided. For example, as illustrated in FIG. 3D, the home screen of the main display area 10 includes time information, a general application and a dock bar application, but the home screen of the sub display area 20 may include only the time information and the dock bar application.

In FIG. 3D, the general application is not included in the sub display area 20, but there is no limitation thereto. For example, when the area to provide information is changed, the processor 140 may change not only the object, but also the size, content, and layout of the object as well.

When the area to display information is reduced, the processor 140 may either not provide a portion of an object, or reduce the size of the object. Otherwise, the processor 140 may change the layout and reduce the gap between the objects so that more objects can be displayed.

Meanwhile, when the direction of the electronic device 100 is changed and thus the display area is changed, the processor 140 may change the operation state of the application that is being executed and provide it on another display area. For example, when the direction of the electronic device 100 is changed with a message indicating that a telephone call or a text message has been received being displayed on the main display area 10, the processor 140 may control the display 110 to display a UI indicating that a telephone call is connected or the text message on the sub display area 20 or on the round display area 30.

Otherwise, when the direction of the electronic device 100 is changed with a camera application being executed and thus a preview being displayed on the main display area 10, the processor 140 may control the display 110 to display a previously photographed image on the sub display area 20.

Furthermore, when the direction of the electronic device 100 is changed, the processor 140 may control the display 110 to divide the displayed information and display the divided information on different display areas. For example, when the direction of the electronic device 100 is changed with the camera application executed and a preview and a setting menu of the camera application displayed on the main display area 10, the processor 140 may control the display 110 to display the preview on the sub display area 20 and the setting menu on the round display area 30, respectively.

FIGS. 4A to 4F are diagrams illustrating examples where at least two of the main display area 10, the sub display area 20, and the round display area 30 are being used.

Figure 4A:
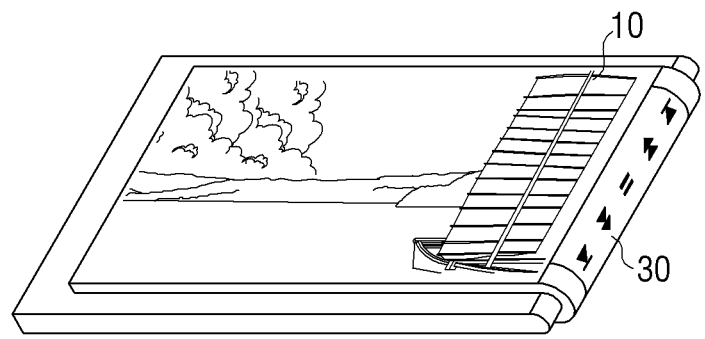
FIGS. 4A to 4F are diagrams illustrating examples of using at least two areas of a main display area, a sub display area, and a round display area.

As illustrated in FIG. 4A, the processor 140 may provide information that related to each other on two areas of the main display area 10, the sub display area 20, and the round display area 30. For example, the processor 140 may control the display 110 to display a video on the main display area 10, and a UI for controlling the video on the round display area 30. In this case, the processor 140 may control the display 110 not to display information on the sub display area 20.

Otherwise, when the camera application is executed, the processor 140 may display a preview on the main display area 10, and display a setting menu on the round display area 20.

Figure 4B:
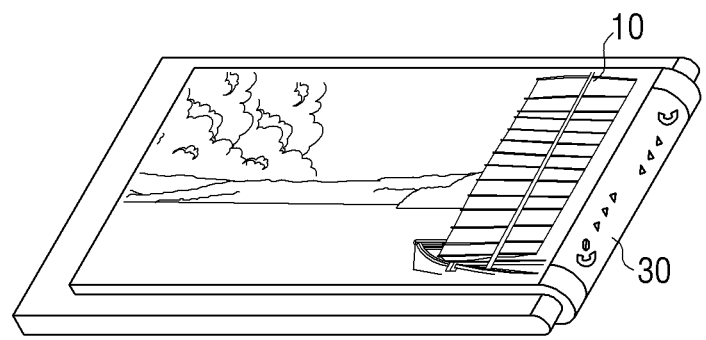

As illustrated in FIG. 4B, the processor 140 may provide two pieces of information that are not related to each other on two areas of the main display area 10, the sub display area 20, and the round display area 30. For example, the processor 140 may control the display 110 to display a video on the main display area 10, and display a UI for receiving a telephone call on the round display area 30. The processor 140 may control the display 110 not to provide information on the sub display area 20.

Otherwise, as illustrated in FIG. 4A, when a telephone call is received with a UI for controlling a video displayed on the round display area 30, the processor 140 may control the display 110 to display a UI for receiving a telephone call on the round display area 30 and move the UI for controlling a video to the sub display area 20 and display the UI for controlling a video on the sub display area 20.

When a UI for receiving a telephone call is touched and thus the telephone call is connected, the processor 140 may display a UI for telephone conversation on the round display area 30, and continue replaying the video. In this case, the processor 140 may mute the volume of the video. Otherwise, the processor 140 may temporarily pause the video.

Otherwise, when the UI for receiving a telephone call is touched and thus the telephone call is connected, the processor 140 may display a UI for telephone conversation on the main display area 10, and stop the video, and control the display 110 to display replay information on the round display area 30.

FIGS. 4A and 4B illustrate the case of using a video application, but there is no limitation thereto. For example, the processor 140 may operate in the same manner when using another type of application such as the camera application.

FIGS. 4A and 4B illustrate the method of using the main display area 10 and the round display area 30, but a method of using the main display area 10 and the sub display area 20, and a method of using the sub display area and the round display area 30 may be the same, and thus detailed explanation will be omitted.

Figure 4C:
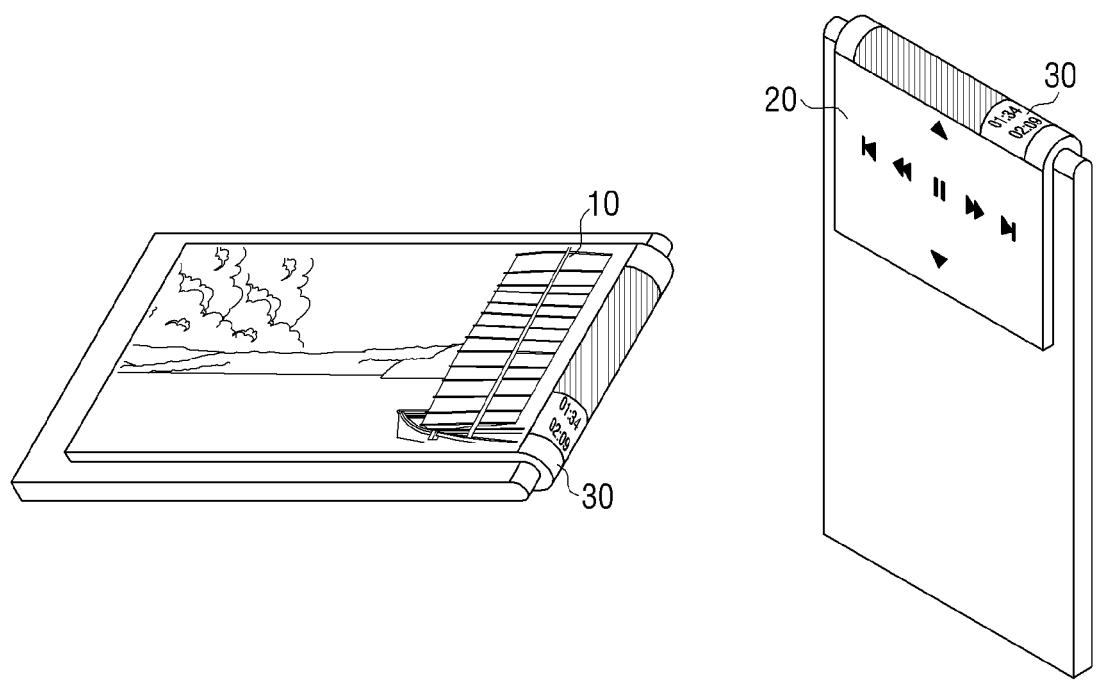

Furthermore, as illustrated in FIG. 4C, the processor 140 may provide related information using all the main display area 10, the sub display area 20, and the round display 30. For example, the processor 140 may control the display 110 to display a video on the main display area 10, a UI for controlling the video on the sub display area 20, and a UI indicating the time point of replaying the video on the round display area 30.

Otherwise, the processor 140 may provide pieces of information that are not related to one another using all the main display area 10, the sub display area 20, and the round display area 30. For example, the processor 140 may control the display 110 to display a video on the main display area 10, a text message on the sub display area 20, and the state of the electronic device 100 such as the state of a battery on the round display area 30.

Otherwise, the processor 140 may provide pieces of information that are related to each other on two areas of the main display area 10, the sub display area 20, and the round display area 30, and provide unrelated information on the remaining area.

Furthermore, as explained with reference to FIGS. 3A to 3D, when the direction of the electronic device 100 is changed, the processor 140 may change the display area of the information being displayed in each area. For example, the processor 140 may control the display 110 to display the information being displayed on the main display area 10 on the sub display area 20, the information being displayed on the sub display area 20 on the round display area 30, and the information being displayed on the round display area 30 on the main display area 10. In this case, the processor 140 may control the display 110 to change the layout of the information being displayed on each area and display the information on other areas.

Otherwise, the processor 140 may combine or divide the information being displayed on each area and change the area to display the combined or divided information. For example, the processor 140 may control the display 110 to divide the information being displayed on the main display area 10 and display the divided information on the sub display area 20 and on the round display 30, and control the display 110 to display the information displayed on the sub display area 20 and the round display area 30 on the main display area 10.

Figure 4D:
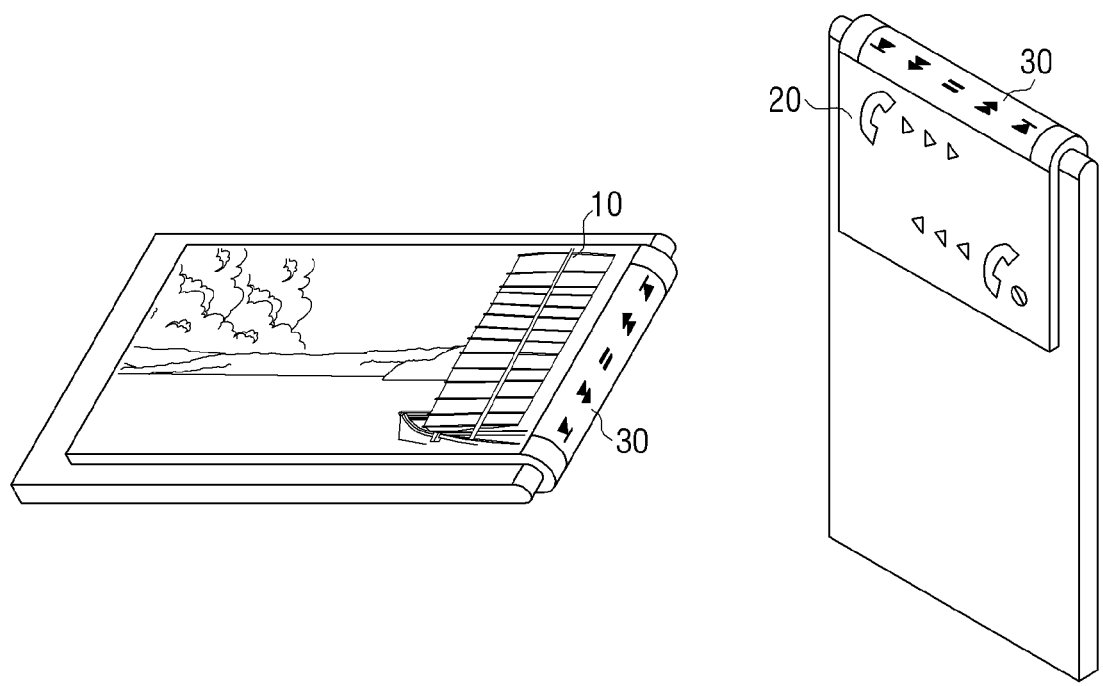

Furthermore, when a telephone call is received at a state such as that illustrated in FIG. 4C, the processor 140 may control the display 110 to display a UI for receiving a telephone call on the sub display area 20, and to move a UI for controlling a video to the round display area 30 and display the UI for controlling the video, as illustrated in FIG. 4D. In this case, the user may make a decision whether or not to receive the telephone call while watching the video displayed on the main display area 10.

Otherwise, the processor 140 may display the UI for receiving a telephone call on the round display area 30. In this case, the user may continue watching the video displayed on the main display area 10.

Figure 4E:
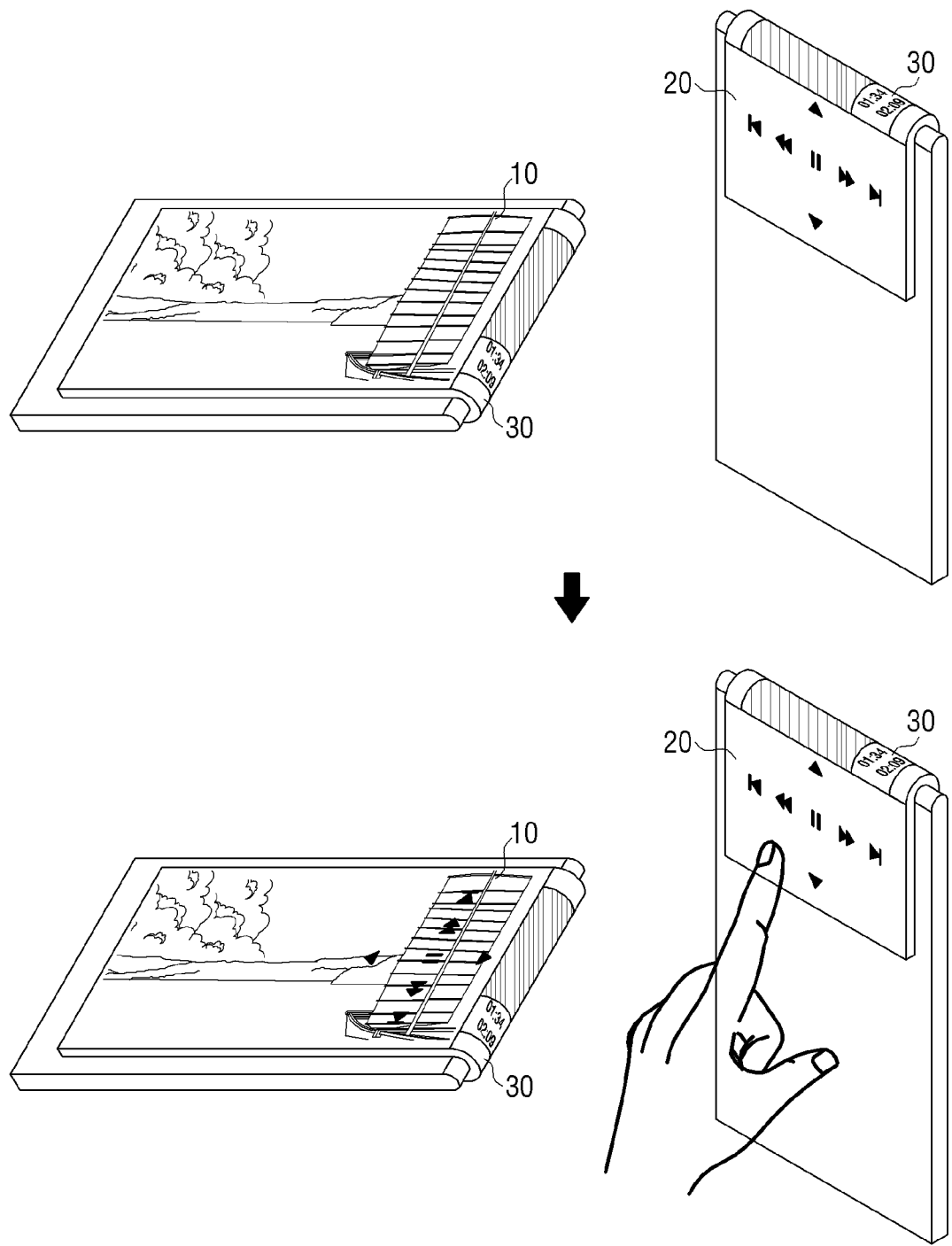

Furthermore, as illustrated in FIG. 4E, when a touch input is received on the sub display area 20, the processor 140 may control the display 110 to display the UI displayed on the sub display area 20 on the main display area 10. For example, when the user touches the sub display area 20 at a state like FIG. 4C, the processor 140 may control the display 110 to display a UI for controlling the video of the sub display area 20 on the main display area 10. The view on the bottom right of FIG. 4E is an illustration for the sake of ease of explanation, and thus the user may actually touch the sub display area 20 and perform the aforementioned operations without changing the direction of the electronic device while watching the video of the main display area 10.

The processor 140 may control the display 110 to display the UI for controlling a video such that the UI overlaps the main display area 10. Furthermore, the processor 140 may control the replay of the video according to a user manipulation of additionally touching the sub display area 20. That is, the user may touch the UI displayed on the sub display area 20 without directly looking at the UI of the sub display area 20.

Meanwhile, when a touch input is received on the main display area 10, the processor 140 may display the UI displayed on the main display area 10 on at least one of the sub display area 20 and the round display area 30. Especially, when the main display area 10 and the sub display area 20 are of the same size, the processor 140 may display the UI displayed on the main display area 10 on the sub display area 20.

Figure 4F:
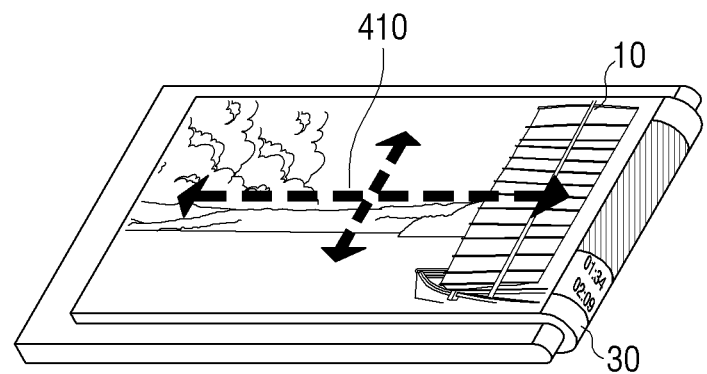
Figure 4F:
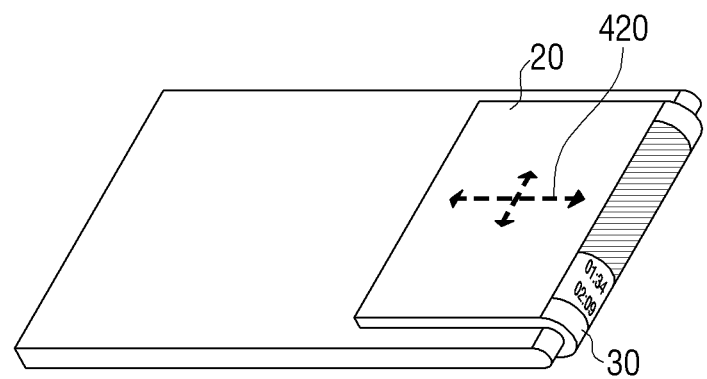

Meanwhile, according to FIG. 4F, even when adjusting a same setting value, it is possible to vary the adjustment extent of the setting value depending on which area of the main display area 10, the sub display area 20, and the round display area 30, the touch manipulation relates to. For example, when a drag manipulation regarding the main display area 10 is input with a video displayed on the main display area 10, the processor 140 may adjust the replay time or volume and the like according to the direction of the drag manipulation. Furthermore, the processor 140 may adjust the replay time or volume and the like with only the drag manipulation of the sub display area 20. In this case, the processor 140 may adjust the replay time or volume and the like more minutely when the drag manipulation is for the sub display area 20 than for the main display area 10.

GUIs 410, 420 for indicating directions illustrated in FIG. 4F are used for the sake of convenience, but in some cases, the GUIs 410, 420 may be displayed on a display area. For example, when there is a touch by the user, the processor 140 may control the display 110 to display GUIs of four directions based on the touched point.

FIGS. 4A to 4F merely illustrate an example embodiment, without limitation. For example, the main display area 10, the sub display area 20, and the round display area 30 of FIG. 4A to FIG. 4F may be replaced among one another. Furthermore, the video application and the telephone application in FIGS. 4A to 4F may be replaced with other applications.

Figure 5A:
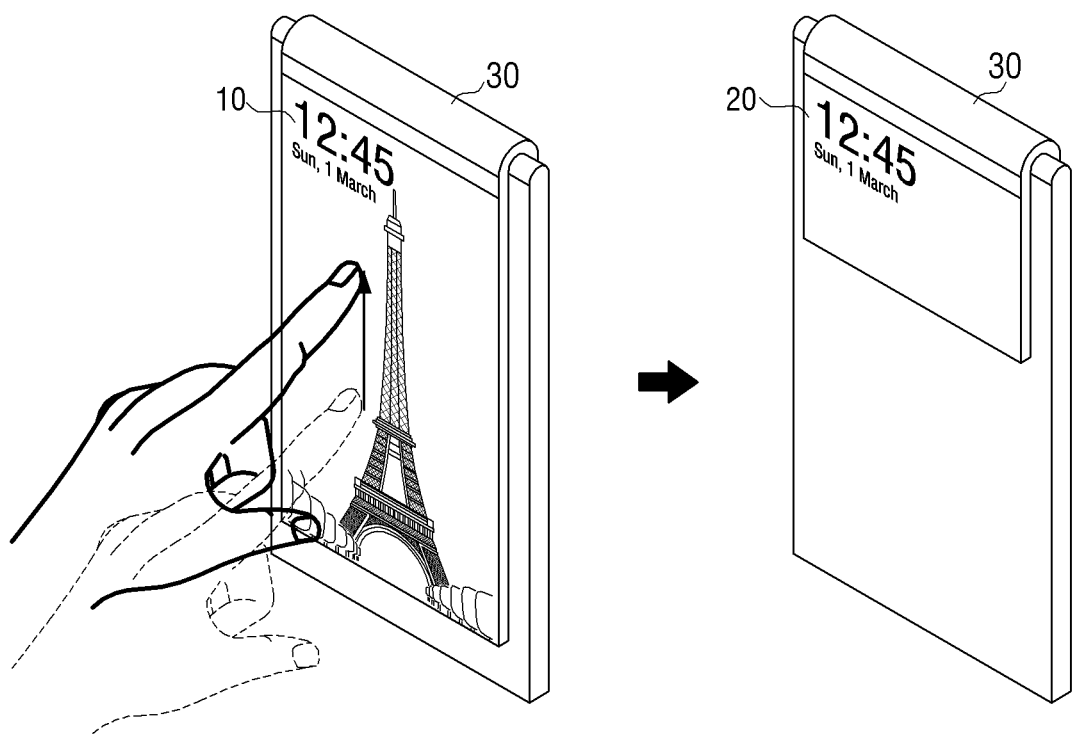
FIGS. 5A and 5B are diagrams illustrating each area and an example of an operation based on a touch input.
Figure 5B:
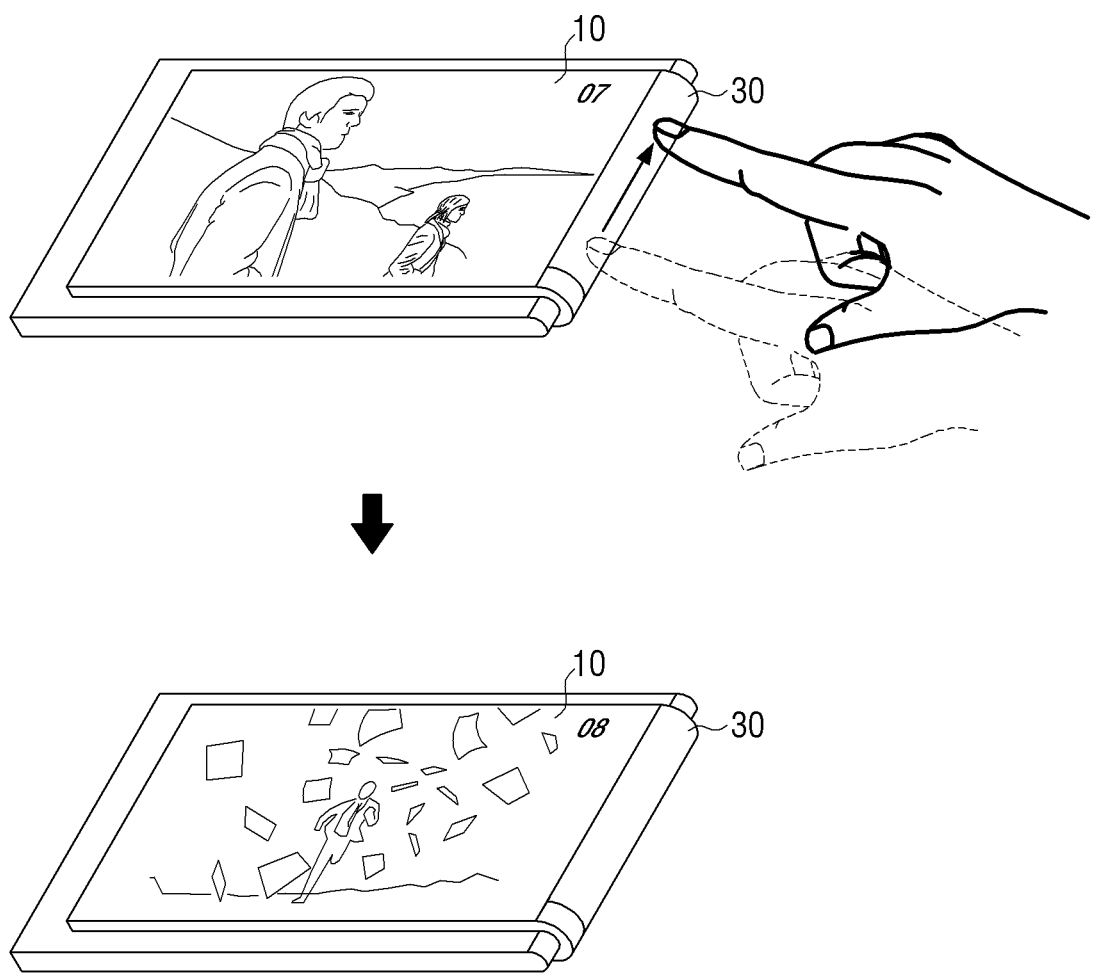

FIG. 5A and FIG. 5B are diagrams illustrating an example of each of the areas and operations based on a touch input.

As illustrated in FIG. 5A, when there is a drag input from one area of the main display area 10 towards the round display area 30, the processor 140 may control the display 110 to display the information being provided on the main display area 10 on the sub display area 20 instead.

The processor 140 may control the display 110 to display the information being provided on the main display area 10 on the sub display area 20 instead only when there is a drag input of or greater than a predetermined size.

When there is information being provided on the sub display area 20 before a drag input is made, the processor 140 may control the display 110 not to provide the information being provided on the sub display area 20 any longer. Otherwise, the processor 140 may control the display 110 to display the information being provided on the sub display area 20 on the main display area 10 or on the round display area 30 instead.

Otherwise, when there is a drag input from one area of the sub display area 20 towards the round display area 30, the processor 140 may control the display 110 to display the information being provided on the sub display area 20 on the main display area 10 instead.

Meanwhile, a similar operation may be performed through an area that is not providing any information. For example, when there is a drag input from the round display area 30 to one area of the main display area 10 with no information being provided from the main display area 10 but information being provided from the sub display area 20, the processor 140 may control the display 110 to display the information being provided on the sub display area 20 on the main display area 10.

Otherwise, when there is a drag input from the round display area 30 to one area of the sub display area 20 with the main display area 10 providing information but the sub display area 20 not providing any information, the processor 140 may control the display 110 to display the information being provided on the main display area 10 on the sub display area 20.

FIG. 5A illustrates the case of using the main display area 10 and the sub display area 20 only, but there is no limitation thereto. For example, the processor 140 may control the display 110 to display the information being provided on one of the main display area 10 and the sub display area 20 on the round display area 30 based on the type of the user input. Otherwise, the processor 140 may control the display 110 to display the information being provided on the round display area 30 on one of the main display area 10 and the sub display area 20 instead.

Furthermore, as illustrated in FIG. 5B, the processor 140 may receive a touch input even when information is not being provided on a certain area. For example, then there is a user input of dragging the round display area 30 with a broadcasting content displayed on the main display area 10, the processor 140 may change the channel or volume of the broadcasting content. In this case, the round display area 30 may not be providing information. In another example, when there is a user input of dragging the sub display area 20 with a broadcast content displayed on the main display area 10, the processor 140 may change the channel or volume of the broadcasting content.

Hereinafter, explanation will be made in greater detail on various example embodiments for arranging the display antenna 130, and on the method for the processor 140 controlling the display antenna 130.

Figure 6:
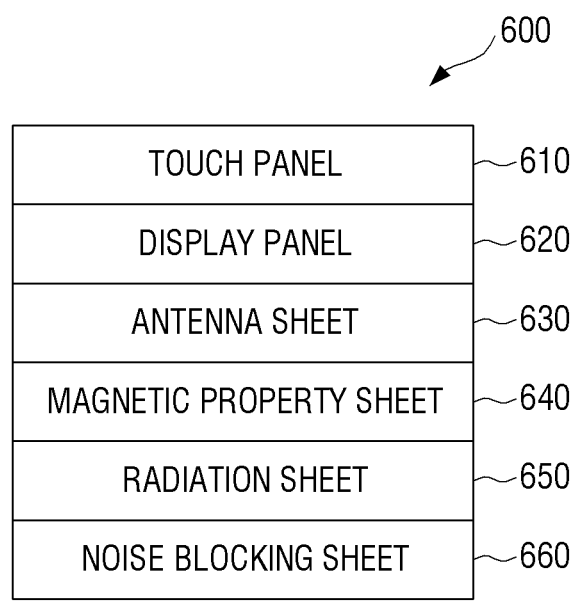
FIG. 6 is a diagram illustrating an example arrangement structure of a display antenna.

FIG. 6 is a diagram illustrating an example structure of arrangement of a display that includes a display antenna according to an example embodiment of the present disclosure.

Referring to FIG. 6, the display 600 that includes a display antenna may include a touch panel 610, a display panel 620, an antenna sheet 630, a magnetic property sheet 640, a radiation sheet 650, and a noise blocking sheet 660.

The touch panel 610 may sense a user's touch, and output a signal regarding the user's touch sensed by a main circuit board not illustrated herein.

The display panel 620 may be arranged under the touch panel 610. The display panel 620 may output image signals from the main circuit board not illustrated herein.

The antenna sheet 630 may be arranged under (for example: on a lower surface) of the display panel 620. The antenna sheet 630 may include at least one antenna. The antenna sheet 630 may be used in at least one wireless communication (for example: Wi-Fi, 3GPPS, LTE, 5G, near field communication (NFC)). At least one antenna of the antenna sheet 630 may have the shape of a loop. At least one antenna of the antenna sheet 630 may be realized as a Flexible Printed Circuit Board (FPCB) or an Indium Tin Oxide (ITO). The main circuit board may receive a wireless signal from the antenna sheet 630, convert the received wireless signal into a baseband signal, and process the converted baseband signal. The main circuit board may generate a baseband signal, convert the generated baseband signal into a wireless signal, and transmit the converted wireless signal in the air through the antenna sheet.

The magnetic property sheet 640 may be arranged under the antenna sheet 630 (for example: on a lower surface). The magnetic property sheet 640 may be arranged between the antenna sheet 630 and a peripheral metal (or ground) (for example: housing, radiation sheet 650, or noise blocking sheet 660 and the like). The magnetic property sheet 640 may induce an electromagnetic field from the antenna sheet 630, and prevent an eddy current from being generated in the peripheral metal by the electromagnetic field from the antenna sheet 630. The electromagnetic field may be transmitted to the magnetic property sheet 640, and the high resistance (high permeability or high electric wave specific absorption rate) may prevent an eddy current from being generated in the peripheral metal. Since no eddy current is generated in the peripheral metal, the electromagnetic field may be concentrated on the front of the screen without being generated on the opposite direction, and the short distance wireless communication (for example: NFC communication) may not deteriorate. That is, the magnetic property sheet 640 may keep the magnetic field far away from the peripheral metal. Furthermore, the magnetic property sheet 640 may amplify a short distance wireless communication signal (for example: NFC signal) and broaden the radius distance for receiving a signal in the antenna sheet 630. The magnetic property sheet 640 may include a ferrite sheet.

The radiation sheet 650 (for example: graphite) sheet may be arranged under (for example: lower surface) the magnetic property sheet 640. The radiation sheet 650 may be arranged between the antenna sheet 630 and the magnetic property sheet 640. The radiant sheet 650 may diffuse the heat generated from the display 110 evenly on the entirety of the surface and prevent the heat concentration phenomenon. The radiant sheet 650 may include a thin film metal tape having a high heat conductivity.

The noise blocking sheet 660 (for example: Electro Magnetic Interference (EMI) blocking sheet, EMI blocking tape or EMI blocking paint and the like) may be arranged under (for example: lower surface) of the radiant sheet 650. The noise blocking sheet 660 may prevent unnecessary electromagnetic signals and any interruption to receiving desirable electronic signals.

Meanwhile, the configuration disclosed in FIG. 6 is merely an example embodiment, and thus a portion of the configuration disclosed in FIG. 6 may be removed, or additional configuration may be added. Furthermore, in another example embodiment, the order of arrangement of the configuration disclosed in FIG. 6 may be modified.

Figure 7A:
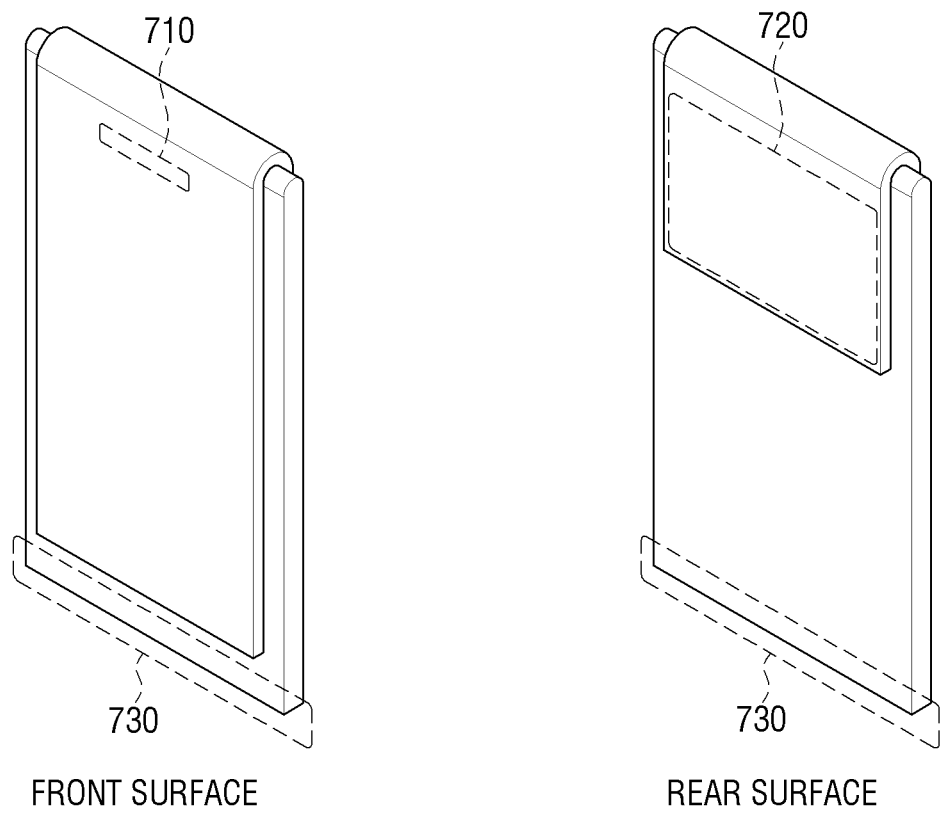
FIGS. 7A to 7C are diagrams illustrating an example of arrangement of an antenna in an example embodiment in which there is one receiver.
Figure 7B:
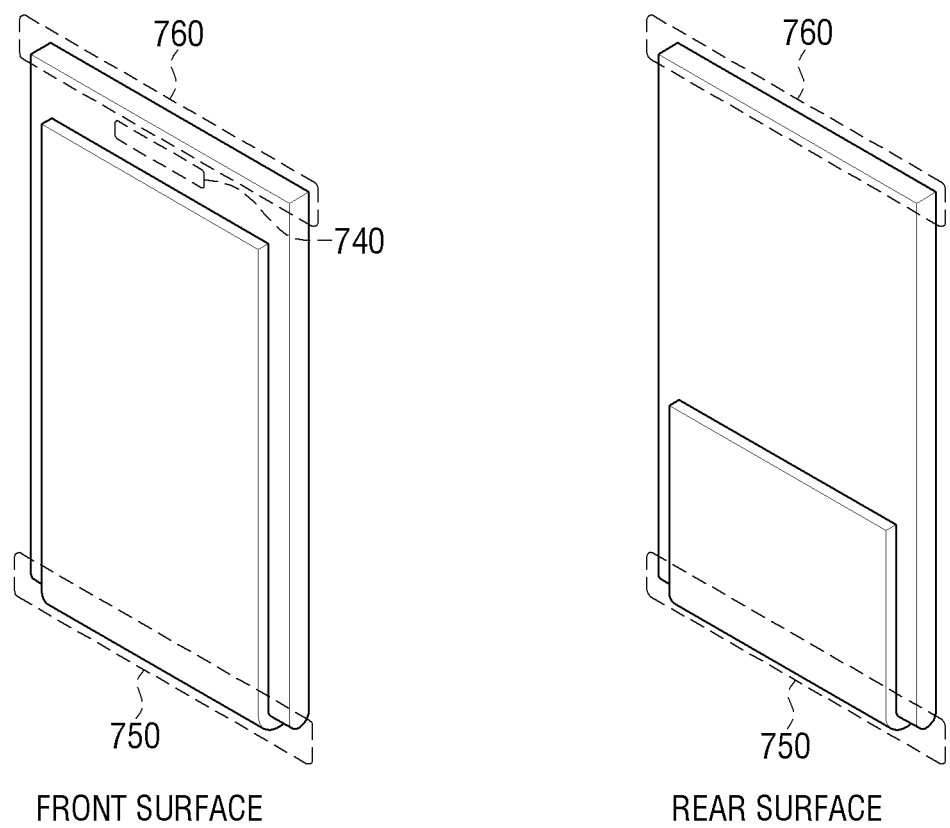
Figure 7C:
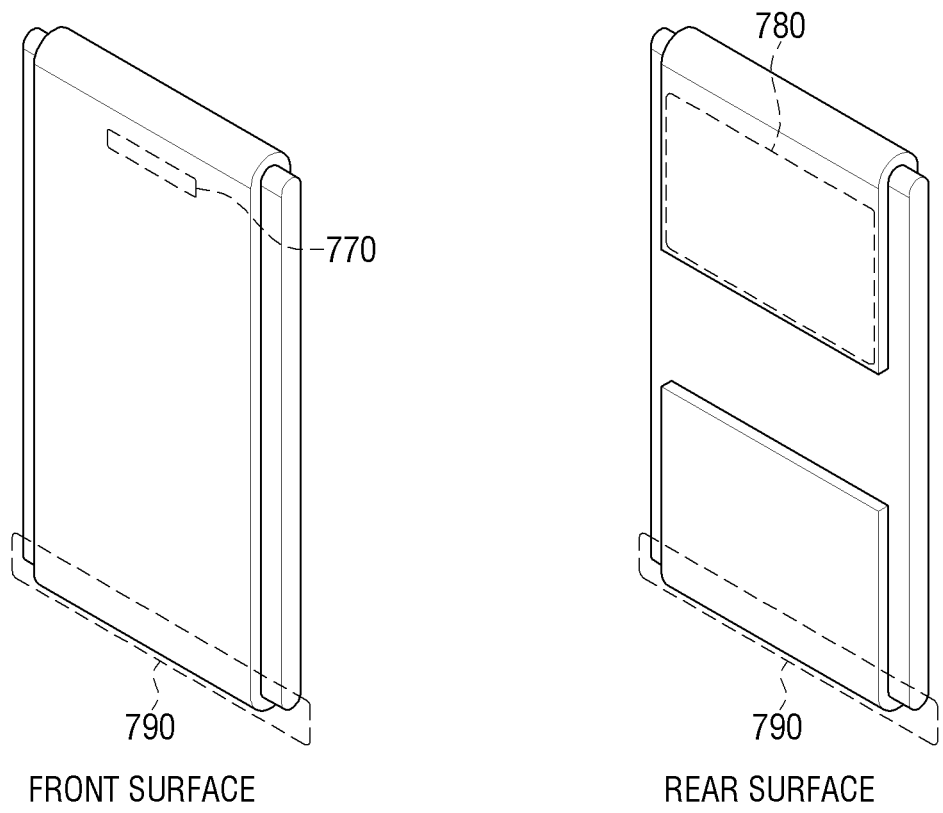

FIGS. 7A to 7C are diagrams illustrating an example of arrangement of an antenna when there is one receiver.

As illustrated in FIG. 7A, a receiver (e.g., including audio output circuitry) 710 may be located on a front upper end of the electronic device 100, and a display antenna 720 may be located on a rear upper end of the electronic device 100, and a lower end antenna 730 may be located on a lower end of the electronic device 100. Furthermore, in the example embodiment of FIG. 7A, the sub display area 20 may be formed to extend from the main display area 10 to the upper end of the electronic device 100.

In this case, in consideration of the distance between the antennas 720, 730 and the user, the processor 140 may control the antenna that is distant from the user to operate as the RX/TX antenna, and control the antenna that is close to the user to operate as the RX antenna. For example, the processor 140 may control the antenna 720 to operate as the antenna for receiving the voice data transmitted from an external terminal and for transmitting the voice data of the electronic device 100 to the external terminal (that is, RX antenna).

Furthermore, the processor 140 may change the RX/TX antenna and the RX antenna in consideration of the state of the network (for example, Specific Absorption Rate (SAR)). For example, the processor 140 may determine the network state depending on the state of gripping by the user. For example, in the case where the user is gripping a lower end of the electronic device 100 through the sensor 165, the processor 140 may determine the network state of the lower end antenna 730. When it is determined that the network state is not good (that is, when it is determined that the transmission/reception sensitivity of the lower end antenna is below a predetermined value), the processor 140 may control the lower end antenna 730 to operate as the RX antenna, and control the antenna 720 to operate as the RX/TX antenna.

That is, the processor 140 may control the antennas 720, 730 in consideration of the distance between the antenna and the head of the user, state of gripping by the user, the network state and the like.

In another example embodiment, as illustrated in FIG. 7B, a receiver 740 may be located on a front upper end of the electronic device 100, and a display antenna 750 may be located on a lower end of the electronic device 100, and an upper end antenna 760 may be located on an upper end of the electronic device 100. Meanwhile, in the example embodiment of FIG. 7B, the sub display area 20 may have been formed to extend from the main display area 10 towards a lower end direction of the electronic device 100.

Herein, the processor 140 may control the upper end antenna 760 that performs voice calls with an external terminal to operate as the antenna for receiving the voice data transmitted from the external terminal (that is, RX antenna), and may control the display antenna 750 to operate as the antenna for transmitting the voice data of the electronic device 100 to the external terminal (that is, RX/TX antenna).

Furthermore, the processor 140 may change the RX/TX antenna and the RX antenna in consideration of the network state (for example, Specific Absorption Rate, SAR). That is, when it is determined that the network state is not good (that is, when it is determined that the transmission/reception sensitivity of the display antenna 750 is below the predetermined value), the processor 140 may change the display antenna 750 to operate as the RX antenna, and change the upper end antenna 760 to operate as the RX/TX antenna.

In another example embodiment, as illustrated in FIG. 7C, a receiver 770 may be located on a front upper end of the electronic device 100, and a first display antenna 780 may be located on a rear upper end of the electronic device 100, and a second display antenna 790 may be located on a lower end of the electronic device 100. Meanwhile, in an embodiment of FIG. 7C, the sub display area 20 may have been formed to extend from the main display area 10 to an upper end or a lower end direction of the electronic device 100.

Herein, the processor 140 may control a first display antenna 780 to operate as the antenna for receiving the voice data transmitted from an external terminal (that is, RX antenna), and control a second display antenna 790 to operate as the antenna for transmitting the voice data of the electronic device 100 (that is, RX/TX antenna). Furthermore, when it is determined that the network state is not good (that is, when it is determined that the transmission/reception sensitivity of the second display antenna 790 is below the predetermined value), the processor 140 may change the second display antenna 790 to operate as the RX antenna, and change the first display antenna 780 to operate as the RX/TX antenna.

Figure 8A:
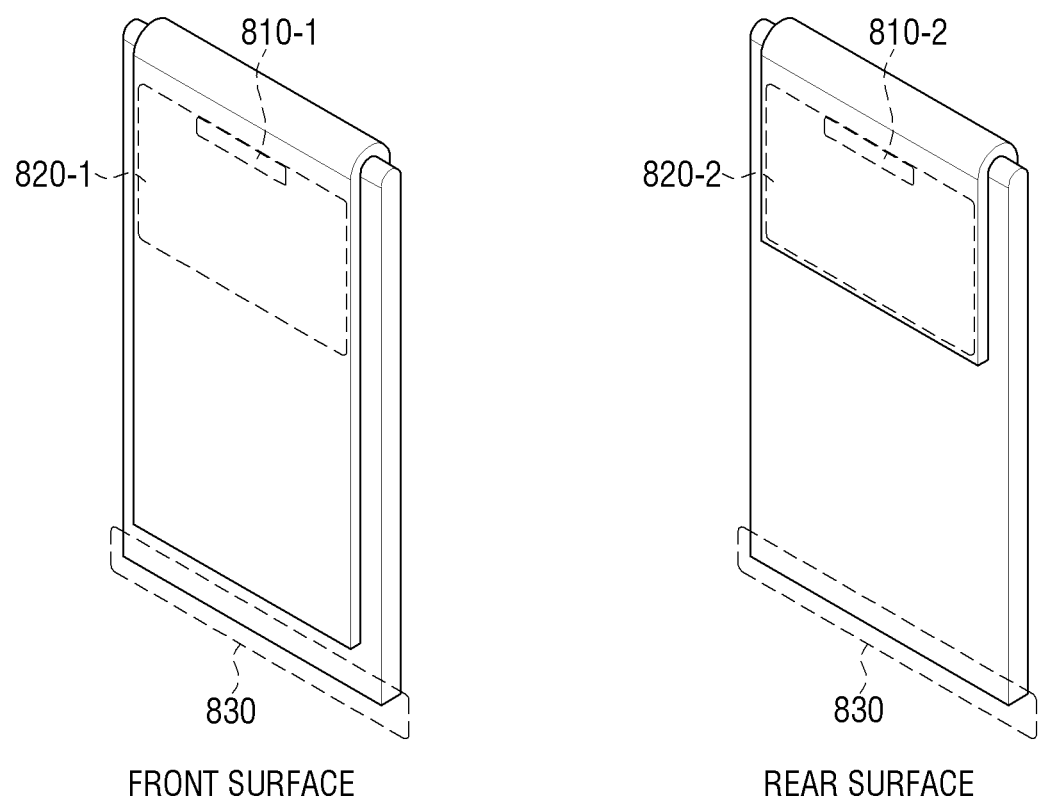
FIGS. 8A to 8C are diagrams illustrating an example of arrangement of an antenna in an example embodiment in which there are two receivers.
Figure 8B:
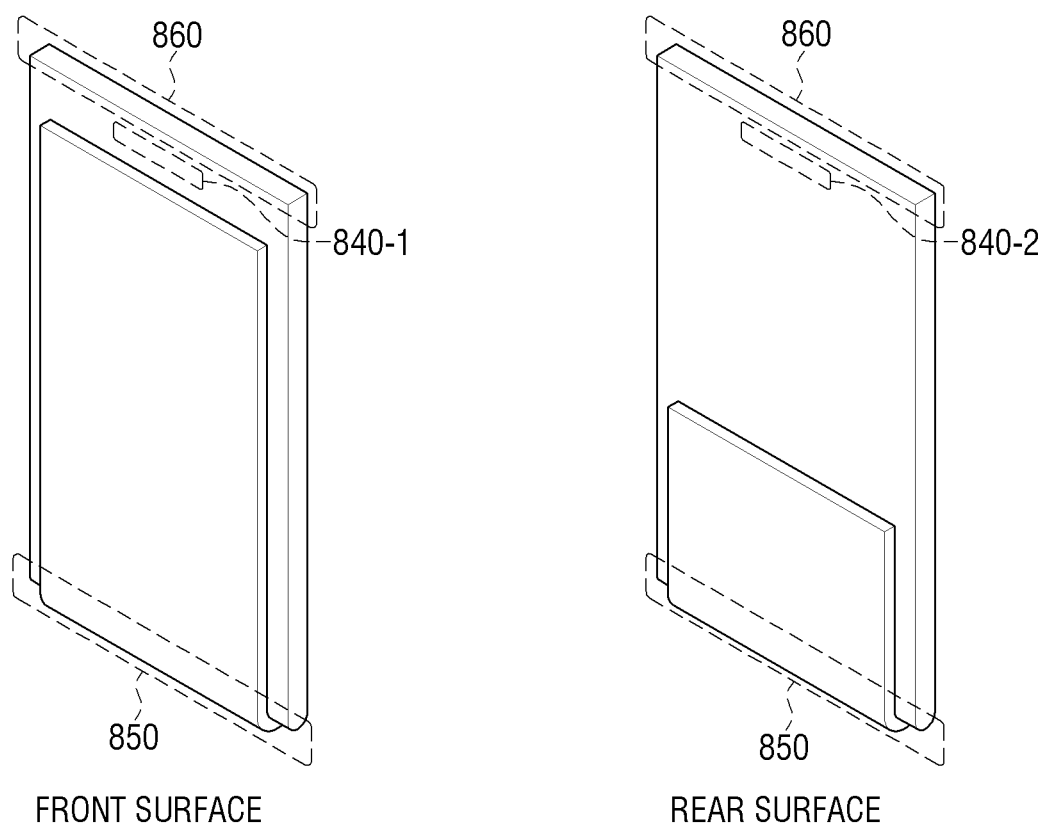
Figure 8C:
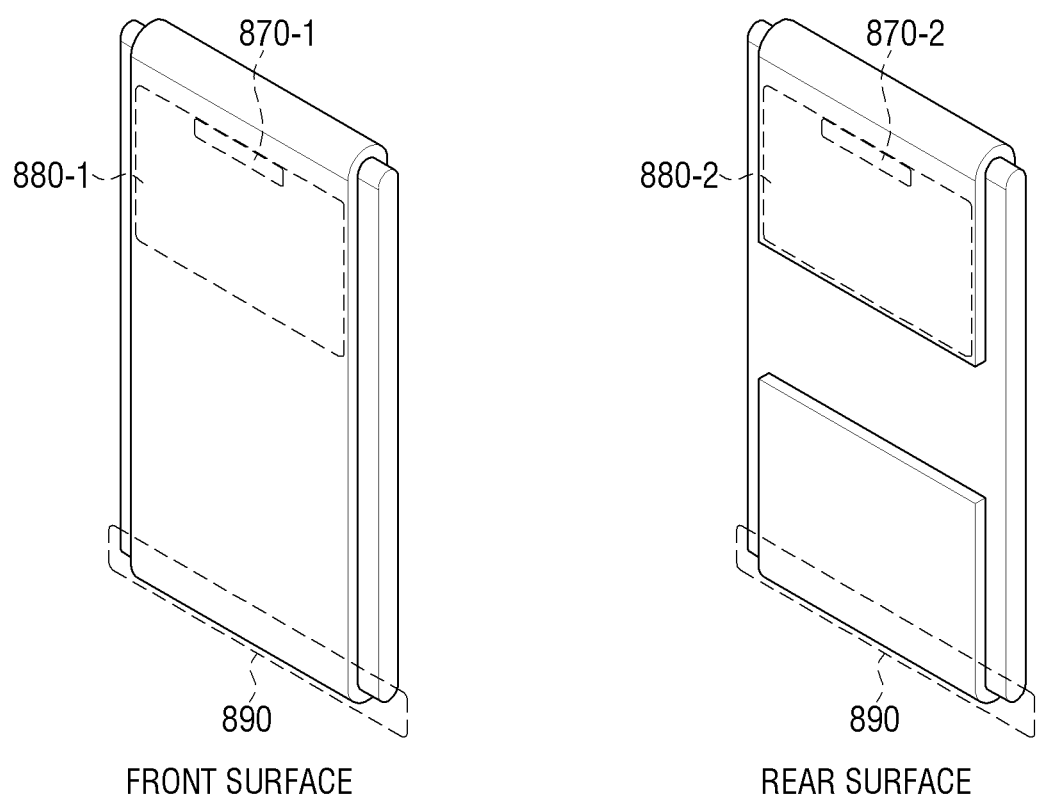

FIGS. 8A to 8C are diagrams illustrating an example of an arrangement of antennas when there are two receivers.

As illustrated in FIG. 8A, on a front upper end and on a rear upper end of the electronic device 100, a first receiver (e.g., including audio output circuitry) 810-1 and a second receiver (e.g., including audio output circuitry) 810-2 may be located, and on a front upper end and on a rear upper end of the electronic device 100, a first display antenna 820-1 and a second display antenna 820-2 may be located, and on a lower end of the electronic device 100, a lower end antenna 830 may be located. Meanwhile, in an example embodiment of FIG. 8A, the sub display area 20 may have been formed to extend from the main display area 10 to an upper end direction of the electronic device 100.

Herein, the processor 140 may detect a state of the user gripping the electronic device 100 through the sensor 165. For example, the processor 140 may determine which of the front surface and the rear surface of the electronic device 100 touches the head of the user based on the detected the state of gripping by the user. Furthermore, the processor 140 may output audio through, for example, audio output circuitry of one of the first receiver 810-1 and the second receiver 810-2 of the electronic device 100 based on the result of determination, and perform communication with an external terminal through the display antenna located on the opposite side of the receiver from which audio is being output.

For example, when it is determined that the front surface of the electronic device 100 touches the head of the user, the processor 140 may output the audio received from the external device through the first receiver 810-1, and perform communication with the external terminal through the second display antenna 820-2 located on the sub display area 20 located on the opposite side of the first receiver 810-1. Herein, as explained with reference to FIG. 7A, the processor 140 may control the lower end antenna 830 to operate as the RX/TX antenna, and control the second display antenna 820-2 to operate as the RX antenna.

Furthermore, when it is determined that the rear surface of the electronic device touches head of the user, the processor 140 may output the audio received from the external device through the second receiver 810-2, and perform communication with the external terminal through the first display antenna 820-1 located on the main display area 10 located opposite to the second receiver 820. Herein, as explained with reference to FIG. 7A, the processor 140 may control the lower end antenna 830 to operate as the RX/TX antenna, and control the first display antenna 820-1 to operate as the RX antenna.

Furthermore, as explained with reference to FIG. 7A, the processor 140 may control the RX/TX antenna and the RX antenna to exchange operations with each other according to the network state. For example, in the case where the lower end antenna 830 operates as the RX/TX antenna, and the first display antenna 820-1 operates as the RX antenna, when the transmission/reception sensitivity of the lower end antenna 830 deteriorates to below the predetermined value, the processor 140 may change the first display antenna 820-1 to operate as the RX/TX antenna and change the lower end antenna 830 to operate as the RX antenna.

In another example embodiment, as illustrated in FIG. 8B, a first receiver 840-1 and a second receiver 840-2 may be located on a front upper end and on a rear upper end of the electronic device 100, and a display antenna 850 may be located on a lower end of the electronic device 100, and an upper end antenna 860 may be located on an upper end of the electronic device 100. Meanwhile, in the example embodiment of FIG. 8B, the sub display area may have been formed to extend from the main display area 10 to a lower end direction of the electronic device 100.

Herein, as illustrated in FIG. 8A, the processor 140 may sense a state of gripping by the user, and output to one of the first receiver 840-1 and the second receiver 840-2 the audio received from an external terminal. For example, when it is determined that the front surface of the electronic device 100 touches the head of the user, the processor 140 may output the audio received from the external device through the first receiver 840-1. In another example, when it is determined that the rear surface of the electronic device 100 touches the head of the user, the processor 140 may output the audio received from the external device through the second receiver 840-2.

Herein, the processor 140 may control the upper end antenna 860 to operate as the antenna for receiving the voice data transmitted from the external terminal (that is, RX antenna), and control the display antenna 850 as the antenna for transmitting the voice data of the electronic device to the external terminal (that is, RX/TX antenna).

Furthermore, when it is determined that the transmission/reception sensitivity of the display antenna 750 is below a predetermined value, the processor 140 may change the display antenna 850 to operate as the RX antenna, and change the upper end antenna 860 to operate as the RX/TX antenna.

In another example embodiment, as illustrated in FIG. 8C, a first receiver 870-1 and a second receiver 870-2 may be located on a front upper end and on a rear upper end of the electronic device 100, and a first display antenna 880-1 and a second display antenna 880-2 may be located on a front upper end and on a rear upper end of the electronic device 100, and a third display antenna 890 may be located on a lower end of the electronic device 100. Meanwhile, FIG. 8C illustrates that the sub display area 20 is formed to extend form the main display area 10 to an upper end and a lower end direction of the electronic device 100.

Herein, the processor 140 may detect a state of gripping by the user through the sensor 165. For example, the processor 140 may determine which of the front surface and the rear surface of the electronic device 100 touches the head of the user based on the detected state of gripping by the user. Furthermore, when it is determined that the front surface of the electronic device 100 touches the head of the user, the processor 140 may output the audio received from the external device through the first receiver 870-1, and perform communication with the external terminal through the second display antenna 880-2 located on the sub display area 20 located on the opposite of the first receiver 870-1. Herein, as explained with reference to FIG. 7A, the processor 140 may control the third display antenna 890 to operate as the RX/TX antenna, and control the second display antenna 880-2 to operate as the RX antenna.

Furthermore, when it is determined that the rear surface of the electronic device 100 touches the head of the user, the processor 140 may output the audio received from the external device through the second receiver 870-2, and perform communication with the external terminal through the first display antenna 880-1 located on the main display area 10 located opposite to the second receiver 870-2. Herein, as explained with reference to FIG. 7A, the processor 140 may control the third display antenna 890 to operate as the RX/TX antenna, and control the first display antenna 880-1 to operate as the RX antenna.

Furthermore, as explained with reference to FIG. 7A, the processor 140 may control the RX/TX antenna and the RX antenna to exchange operations according to the network state.

Figure 9:
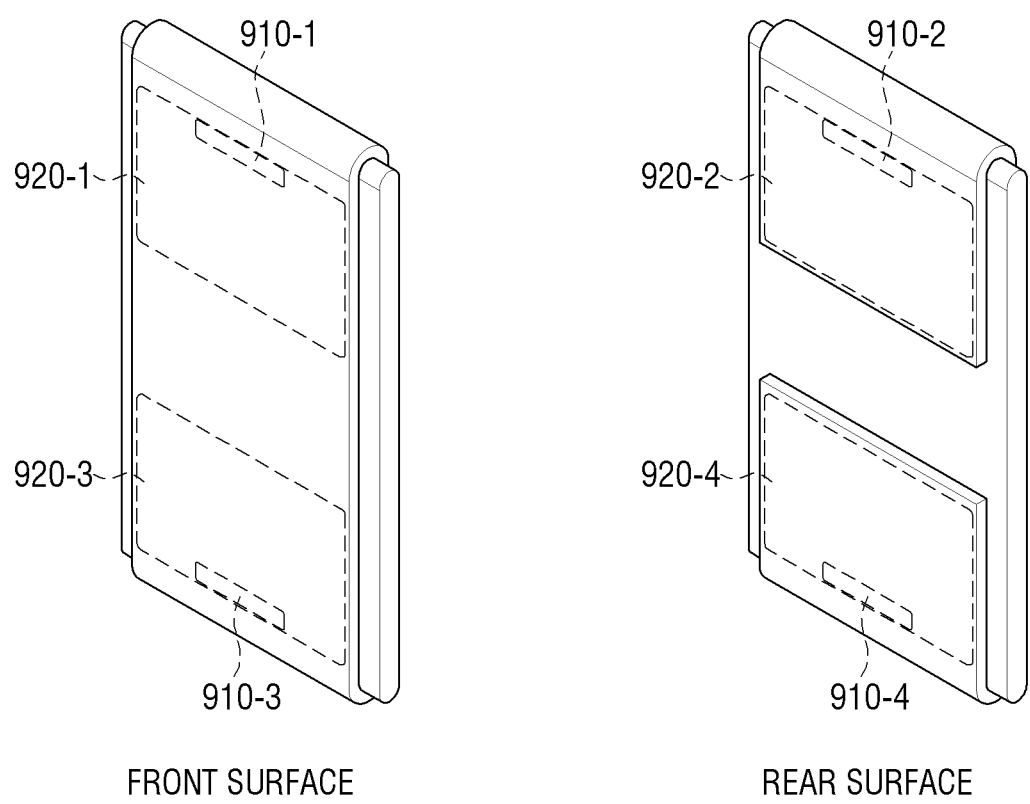
FIG. 9 is a diagram illustrating an example of arrangement of antenna in an example embodiment in which there are four receivers.

FIG. 9 is a diagram illustrating an example of arrangement of antennas when there are four receivers.

As illustrated in FIG. 9, on an upper end of the front and the rear surface of the electronic device 100 and on a lower end of the front and the rear surface of the electronic device 100, a first receiver 910-1 to a fourth receiver 910-4 may be located, respectively, and on an upper end of the front surface and the rear surface of the electronic device 100 and on a lower end of the front surface and the rear surface of the electronic device 100, a first display antenna 920-1 to a fourth display antenna 920-4 may be located, respectively. Meanwhile, in the example embodiment of FIG. 9, the sub display area 20 may have been formed to extend from the main display area 10 to the upper end and the lower end direction of the electronic device 100.

In this case, the processor 140 may detect a state of gripping of the electronic device 100 by the user through the sensor 165. That is, the processor 120 may determine which receiver of the electronic device 100 touches an ear of the user based on the detected state of gripping by the user. Furthermore, the processor 140 may output audio through one of the first receiver 910-1 to the fourth receiver 910-4 of the electronic device 100 according to the result of determination, and perform communication with an external terminal through the display antenna located on the opposite surface and opposite side of the receiver through which the audio is being output.

For example, when it is determined that a front upper portion of the electronic device 100 touches the head of the user, the processor 140 may output the audio received from the external device through the first receiver 910-1, and perform communication with the external terminal through the fourth display antenna 920-4 located on the opposite surface and opposite side of the first receiver 810-1. In this case, the processor 140 may control the fourth display antenna 920-4 to operate as the RX/TX antenna, and control the remaining display antenna to operate as the RX antenna.

Furthermore, as explained with reference to FIG. 7A, the processor 140 may control the RX/TX antenna and the RX antenna to exchange operations. For example, when the transmission/reception sensitivity of the lower end antenna 830 falls below the predetermined value while the fourth display antenna 920-4 operates as the RX/TX antenna, and the remaining display antenna 820-1 operates as the RX antenna, the processor 140 may control the second display antenna 920-2 located on an upper portion of the opposite side of the first receiver 910-1 that currently performs a telephone call to operate as the RX/TX antenna, and control the remaining display antenna to operate as the RX antenna.

Consequently, the processor 140 may select the antenna to operate as the RX/TX antenna from the antennas arranged on the opposite side of the receiver that is in use during a telephone call with an external terminal based on the distance from the head of the user and the network state. For example, an antenna that is the farthest away from the head of the user or an antenna with a good network state may be given a high priority.

Figure 10A:
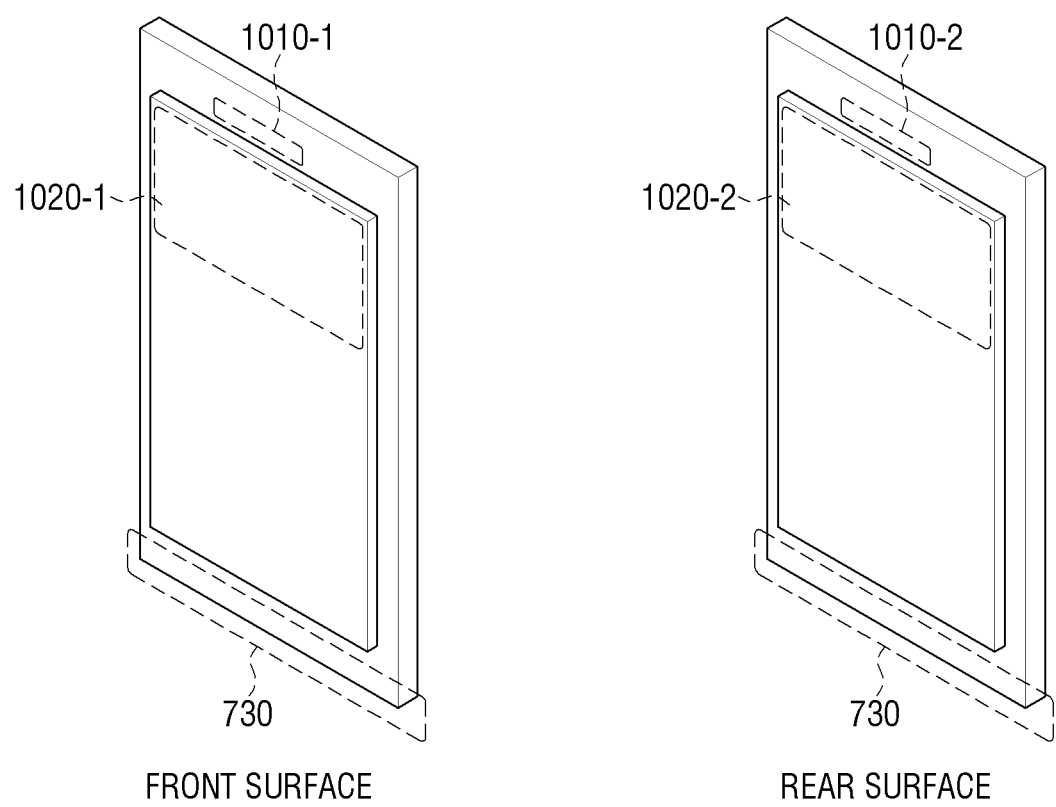
FIGS. 10A and 10B are diagrams illustrating an example of arrangement of an antenna in an example embodiment in which t there is a display on both surfaces of the electronic device.
Figure 10B:
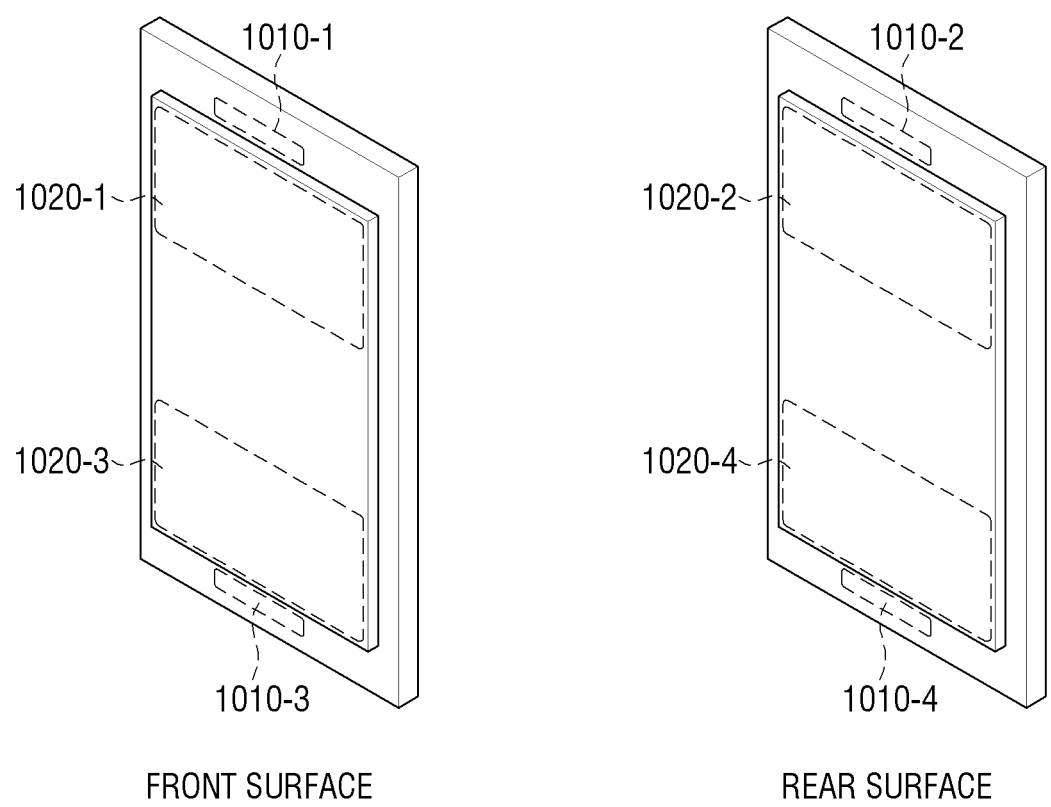

Meanwhile, in the aforementioned example embodiment, the main display area 10 and the sub display area 20 are integrated into one display, but this is merely an example embodiment, and thus the main display area 10 and the sub display area 20 may be realized as separate displays. For example, as illustrated in FIG. 10A and FIG. 10B, on the front surface of the electronic device, a display providing the main display area may be arranged, and on the rear surface of the electronic device 20, a display providing a sub display area may be arranged. Herein, the electronic device 100 may operate in a similar manner as explained hereinabove. That is, the electronic device 100 illustrated in FIG. 10A may operate in the same manner as the electronic device 100 illustrated in FIG. 8A, and the electronic device 100 illustrated in FIG. 10B may operate in the same manner as in FIGS. 9. 1010-1, 1010-2, 1010-3 and 1010-4 refer to respective receivers and 1020-1, 1020-2, 1020-3 and 1020-4 refer to respective display antennas.

Meanwhile, in the aforementioned embodiment, the display antenna is located on an upper portion or on a lower portion of one surface of the electronic device, but this is a mere embodiment. The display antenna may be located on a left side or on a right side of one surface of the electronic device.

Furthermore, on one surface of the electronic device 100, a plurality of display antennas that support a plurality of wireless communication may be arranged. For example, on an upper portion of the main display area 10 of the electronic device 100, a display antenna that supports a first wireless communication may be located, and on a lower portion of the main display area 10 of the electronic device 100, a display antenna that supports a second wireless communication may be located. Herein, the arrangement locations of the plurality of display antennas may be determined according to their usages. For example, a display antenna that supports Wi-Fi wireless communication is generally used when using a web browser, and thus it has nothing to do with its distance from the head of the user, and thus the display antenna may be arranged near the receiver 120. However, a display antenna that supports LTE or 5G wireless communication should not be close to the head of the user, and thus such a display antenna may be arranged far away from the receiver 120.

Furthermore, when the receiver 120 is located on the front surface and the rear surface of the electronic device 100, the processor 140 may use the display antenna located on the opposite surface of the receiver 120 being used. For example, in the case where the receiver located on the front surface of the electronic device is being used, the processor 140 may use the display antenna located on the rear surface, and in the case where the receiver located on the front surface of the electronic device is being used, the processor 140 may use the display antenna located on the front surface.

Furthermore, the processor 140 may drive the display antenna according to the type of application currently being executed. For example, in the case where a web browser application is currently being executed, the processor 140 may perform communication using the display antenna located near the receiver 120. Furthermore, in the case where a telephone call application is currently being executed, the processor 140 may perform communication using the display antenna located far away from the receiver 120.

Meanwhile, in the case of receiving a telephone call from an external terminal, the processor 140 may determine the current orientation of the electronic device 100, and control the display 110 to provide a UI for receiving/rejecting a telephone call on the surface that faces upwards.

Figure 11A:
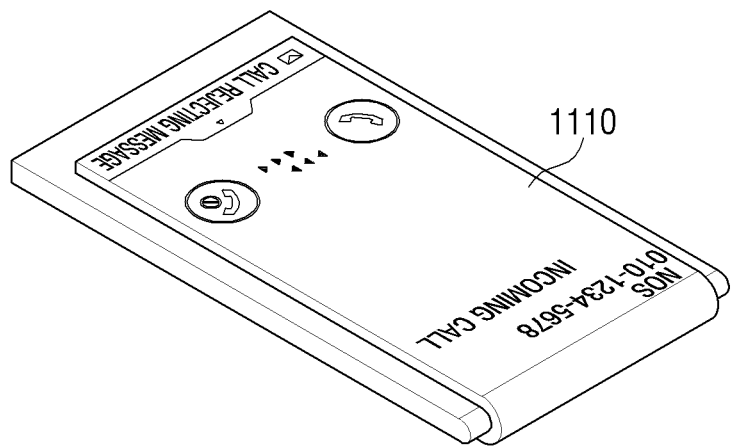
FIGS. 11A to 11C are diagrams illustrating an example embodiment where a telephone call acceptance/rejecting UI is provided based on an orientation of the electronic device in response to an incoming call request.
Figure 11B:
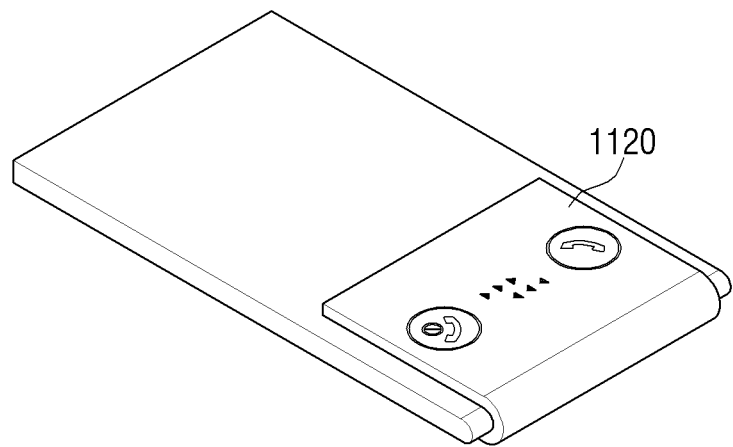
Figure 11C:
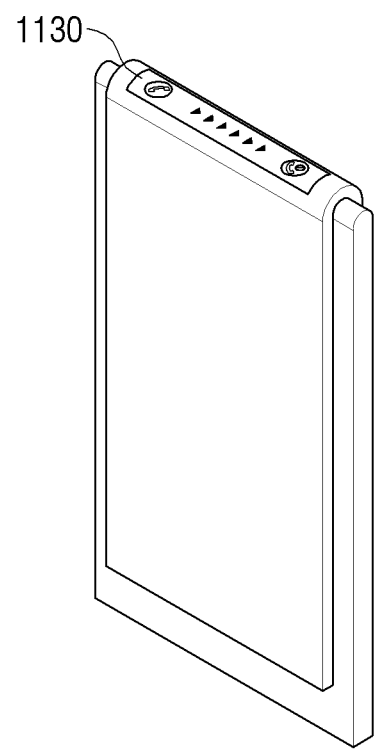

For example, in the case where the front surface of the electronic device 100 faces upwards as illustrated in FIG. 11A, the processor 140 control the display 110 to provide a UI for receiving/rejecting a telephone call 1110 on the main display area 10, as illustrated in FIG. 11A. In another example, in the case where the rear surface of the electronic device 100 faces upwards, the processor 140 may control the display 110 to provide a UI for receiving/rejecting a telephone call 1120 on the sub display area 20, as illustrated in FIG. 11B. In another example, in the case where a top surface portion of the electronic device 100 faces upwards, the processor 140 may control the display 110 to provide a UI for receiving/rejecting a telephone call 1130 on the round display area 20 located on the top surface, as illustrated in FIG. 11C.

Herein, UIs 1110, 1120, and 1130 may have different layouts. That is, the UIs 1110, 1120, and 1130 may have different number of components, different relative locations between the components, and different display formats of the components.

Furthermore, when a user manipulation is necessary while performing a telephone call with an external terminal, the processor 140 may control the display 110 to provide a UI for a telephone call application on the display on the surface where the receiver currently outputting the audio is located. For example, when audio is being output through a receiver located on the front surface while performing a telephone call with the external terminal, the processor 140 may control the display 110 to provide a UI for a telephone call application (for example, volume adjustment, entering number buttons, voice recording and the like) on the main display area 10.

Figure 12:
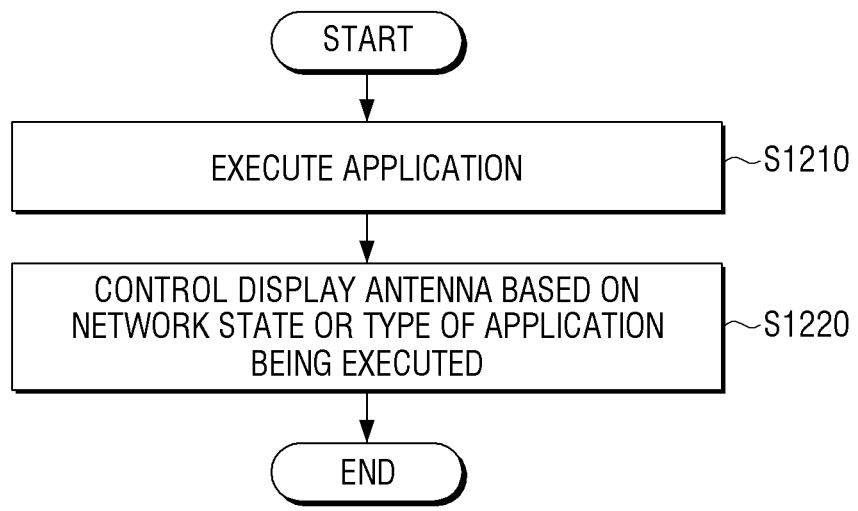
FIG. 12 is a flowchart illustrating an example method of operating an electronic device.

FIG. 12 is a flowchart illustrating an example method for controlling the electronic device 100. Meanwhile, the electronic device 100 explained with reference to FIG. 12 may be one of the electronic devices explained with reference to FIGS. 1 to 11C hereinabove.

The electronic device 100 executes an application (S1210). Herein, the application being executed may, for example, be a telephone call application, web browsing application and the like.

Furthermore, the electronic device 100 controls a display antenna based on the type of application being executed or the network state (S1220). For example, the electronic device 100 may drive the display antenna with a good network state as the RX/TX antenna, and drive the display antenna with a poor network state as the RX antenna. Furthermore, in the case where the type of the application currently being executed is a telephone application, the electronic device 100 may perform a telephone call with the external terminal using the display antenna located far away from the receiver 120. Furthermore, in the case where the type of the application currently being executed is a web browsing application, the electronic device 100 may perform a telephone call with the external terminal using the display antenna located close to the receiver 120.

According to the aforementioned various example embodiments, the electronic device 100 may drive a display antenna based on whether or not there is a telephone call, the distance from the head of the user, the performance of the antenna, the orientation of the electronic device, the state of gripping by the user, the application being executed and the like.

Meanwhile, these methods according to the aforementioned various example embodiments may be programmed and stored in various storage media. Accordingly, the aforementioned various example embodiments may be realized in various types of electronic devices.

For example, a non-transitory computer readable medium for storing a program configured to perform the aforementioned controlling method may be provided.

The non-transitory computer readable medium refers to a computer readable medium that is configured to store data. For example, the various aforementioned applications or programs may be stored in and provided through a non-transitory computer readable medium such as a CD, a DVD, a hard disc, a blue-ray disc, a USB, a memory card, a ROM and the like.

The foregoing example embodiments and advantages are merely examples and are not to be construed as limiting the disclosure. The present teaching can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. An electronic device comprising:
    a display comprising:
        a display panel comprising a main display area arranged on a front surface of the electronic device and a sub display area extending from one side of the main display area and arranged on at least one area of a rear surface of the electronic device; and
        a display antenna located on one or more of the main display area and the sub display area disposed in the display, the display antenna for performing communication with an external terminal;
    a receiver comprising audio output circuitry configured to output audio received from the external terminal; and
    a processor configured to control communication, through the display antenna, based on one or more of a network state and a type of an application being executed in the electronic device.

2. The device according to claim 1,
    wherein the receiver is located on the front surface of the electronic device, and
    the display antenna is located on the sub display area on the rear surface of the electronic device.

3. The device according to claim 2,
    further comprising a low end antenna located on a low end of the electronic device, and configured to perform communication with the external terminal,
    wherein the processor is configured to control the display antenna to operate as an antenna for receiving voice data transmitted from the external terminal, while performing a voice call with the external terminal, and to control the low end antenna to operate as an antenna for receiving the voice data transmitted from the external terminal and for transmitting the voice data of the electronic device to the external terminal.

4. The device according to claim 3,
    wherein the processor is configured to control the low end antenna to operate as the antenna for receiving the voice data transmitted from the external terminal when a transmission/reception sensitivity of the low end antenna is less than a predetermined value, and to control the display antenna to operate as the antenna for receiving the voice data transmitted from the external terminal and for transmitting the voice data of the electronic device to the external terminal.

5. The device according to claim 2,
    wherein the processor is configured to control the display to provide a UI for a telephone application on the main display area.

6. The device according to claim 1,
    wherein the receiver is located on the rear surface of the electronic device, and
    the display antenna is located on at least a portion of the main display area of the front surface of the electronic device.

7. The device according to claim 1,
    wherein the receiver is located on a front upper portion and on a rear upper portion of the electronic device, respectively, and
    the display antenna is located on an upper portion of the main display area and on the sub display area.

8. The device according to claim 7,
    further comprising a sensor configured to sense a state of gripping the electronic device,
    wherein the processor is configured to output the audio through one of a first receiver located on the front upper portion of the electronic device and a second receiver located on the rear upper portion of the electronic device based on the state of gripping detected by the sensor, and to perform communication with the external terminal through a display antenna located opposite to the receiver through which the audio is being output.

9. The device according to claim 8,
    wherein the processor is configured to control the display to provide a UI for a telephone application on a display area where the receiver from which the audio is being output is located on the main display area and the sub display area.

10. The device according to claim 1,
further comprising a sensor configured to sense an orientation of the electronic device,
wherein the processor is configured to determine which surface of the electronic device faces upwards based on the orientation of the electronic device sensed by the sensor when a telephone call request is received from the external terminal, and to control the display to display a UI element for receiving a telephone call or rejecting the telephone call on a display area corresponding to the determined surface.

11. The device of claim 1, further comprising another antenna, and
wherein the processor is configured to determine whether to transmit from the display antenna or from the another antenna based on a gripping state of a user on the electronic device.

12. A method for controlling an electronic device comprising a display, the display including:
a main display area arranged on a front surface of the electronic device, and
a sub display area extending from one side of the main display area and arranged on at least one area of a rear surface of the electronic device, and
a display antenna located on at least one of the main display area and the sub display area, and configured to perform communication with an external terminal,
the method comprising:
executing an application; and
controlling the display antenna based on one or more of a network state or a type of the application being executed.

13. The method of claim 12, wherein the electronic device further comprises another antenna, and wherein the method comprises determining whether to transmit from the display antenna or from the another antenna based on a gripping state of a user on the electronic device.

* * * * *